US012625393B2

(12) United States Patent
Yang et al.

(10) Patent No.: US 12,625,393 B2
(45) Date of Patent: May 12, 2026

(54) WEARABLE ELECTRONIC DEVICE

(71) Applicant: Samsung Electronics Co., Ltd.,
Suwon-si (KR)

(72) Inventors: Hyunmo Yang, Suwon-si (KR);
Sungkwang Yang, Suwon-si (KR);
Junwhon Uhm, Suwon-si (KR);
Geonho Yoon, Suwon-si (KR);
Chulkwi Kim, Suwon-si (KR);
Jongmin Yoon, Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 672 days.

(21) Appl. No.: 18/148,084

(22) Filed: Dec. 29, 2022

(65) Prior Publication Data

US 2023/0204985 A1     Jun. 29, 2023

Related U.S. Application Data

(63) Continuation of application No.
PCT/KR2022/021541, filed on Dec. 28, 2022.

(30) Foreign Application Priority Data

Dec. 29, 2021     (KR) ........................ 10-2021-0191311
Mar. 29, 2022     (KR) ........................ 10-2022-0038486

(51) Int. Cl.
G02C 11/00          (2006.01)
G02C 5/14          (2006.01)
(Continued)

(52) U.S. Cl.
CPC .............. G02C 11/10 (2013.01); G02C 5/146
(2013.01); H02J 7/0045 (2013.01); H02J
50/40 (2016.02)

(58) Field of Classification Search
CPC ....... G02C 11/10; G02C 5/146; H02J 7/0045;
H02J 50/40; H02J 7/00; H02J 7/0042;
(Continued)

(56) References Cited

U.S. PATENT DOCUMENTS 10,317,706 B1     6/2019  Lin
10,670,889 B1     6/2020  Hanover et al.
(Continued)

FOREIGN PATENT DOCUMENTS

KR     10-2014-0044300 A     4/2014
KR     10-2015-0068043 A     6/2015
(Continued)

OTHER PUBLICATIONS

International Search Report dated Mar. 24, 2023, issued in International Application No. PCT/KR2022/021541.
(Continued)

*Primary Examiner* — Thomas K Pham
*Assistant Examiner* — Justin W. Hustoft
(74) *Attorney, Agent, or Firm* — Jefferson IP Law, LLP

(57)          ABSTRACT

A wearable electronic device is provided. The wearable electronic device includes a lens frame configured to accommodate a display member and including a first end and a second end opposite to the first end, a hinge structure including first and second hinge structures connected respectively to the first and second ends, a wearing member including a first and second wearing members connected respectively to the first hinge and second hinge structures, the first wearing member or the second wearing member being configured to move with respect to the lens frame, a battery disposed in the first wearing member, a circuit board disposed in the first wearing member and including electrodes, and a charging terminal structure disposed in the first wearing member and including charging pads exposable to
(Continued)

an outside and a connecting member disposed in the first wearing member and configured to electrically connect the charging pads and the electrodes.

20 Claims, 16 Drawing Sheets

(51) Int. Cl.
    *H02J 7/00*          (2006.01)
    *H02J 50/40*         (2016.01)
(58) Field of Classification Search
    CPC ....... G02B 27/01; G06F 1/1615; G06F 1/163;
                    G06F 1/1635; G06F 1/1681; A61F 9/02
    See application file for complete search history.

(56)                      References Cited

U.S. PATENT DOCUMENTS

| | | |
|---|---|---|
| 2009/0251660 A1 | 10/2009 | Figler et al. |
| 2012/0215291 A1 | 8/2012 | Pugh et al. |
| 2015/0244910 A1 | 8/2015 | Marston et al. |

| | | | |
|---|---|---|---|
| 2017/0248799 A1 | 8/2017 | Streets et al. | |
| 2019/0140478 A1* | 5/2019 | Furukawa | H01G 4/38 |
| 2020/0013226 A1 | 1/2020 | Lee | |
| 2020/0174286 A1 | 6/2020 | Komoda | |
| 2020/0225510 A1* | 7/2020 | Kan | G02C 11/04 |
| 2020/0241329 A1 | 7/2020 | Hanover et al. | |
| 2021/0119363 A1* | 4/2021 | Perry | H05K 3/368 |
| 2021/0191159 A1 | 6/2021 | Rusconi Clerici Beltrami et al. | |
| 2022/0231523 A1 | 7/2022 | Bristol et al. | |
| 2022/0236566 A1 | 7/2022 | Kim et al. | |

FOREIGN PATENT DOCUMENTS

| | | |
|---|---|---|
| KR | 10-1786613 B1 | 10/2017 |
| KR | 10-2019-0110969 A | 10/2019 |
| KR | 10-2020-0056481 A | 5/2020 |
| KR | 10-2020-0124583 A | 11/2020 |
| KR | 10-2021-0080253 A | 6/2021 |
| KR | 10-2022-0109098 A | 8/2022 |

OTHER PUBLICATIONS

European Search Report dated Feb. 4, 2025, issued in European Application No. 22916763.0.

* cited by examiner

412

412-3    412-5    412-4

WEARABLE ELECTRONIC DEVICE

CROSS-REFERENCE TO RELATED APPLICATION(S)

This application is a continuation application, claiming priority under § 365(c), of an International application No. PCT/KR2022/021541, filed on Dec. 28, 2022, which is based on and claims the benefit of a Korean patent application number 10-2021-0191311, filed on Dec. 29, 2021, in the Korean Intellectual Property Office, and of a Korean patent application number 10-2022-0038486, filed on Mar. 29, 2022, in the Korean Intellectual Property Office, the disclosure of each of which is incorporated by reference herein in its entirety.

TECHNICAL FIELD

The disclosure relates to a wearable electronic device.

BACKGROUND ART

Electronic devices to be carried, such as electronic diaries, portable multimedia players, mobile communication terminals, or tablet personal computers (PCs), commonly include a display member and a battery, and have bar-type, folder-type, or sliding-type exteriors, depending on the shape of the display member or battery. Recent improvement in performance of display members and batteries and compactness thereof have commercialized wearable electronic devices which can be partially worn on human bodies, such as wrists or heads. Wearable electronic devices are directly worn on human bodies and may have improved portability and/or user accessibility.

Wearable electronic devices include electronic devices which can be worn on the face by users, such as head-mounted devices (HMD). The HMDs may be useful in implementing virtual reality or augmented reality. For example, a wearable electronic device may provide stereo-scopic images of virtual spaces inside games, which used to be enjoyed through televisions or computer monitors, and may block images of the actual space in which the user stays, thereby implementing virtual reality. Another type of wearable electronic device may implement virtual images while providing an environment such that the user can visually recognize actual images of the space in which the user stays, thereby providing augmented reality in which the user is provided with various pieces of visual information.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Head-mountable wearable electronic devices have recently been designed so as to have a form factor extremely similar to general eyeglasses in order to highlight design elements such as compactness and fashion-oriented aspects. Wearable electronic devices have become compact and thus need to be designed to have minimized charging terminals or buttons such as physical and/or electric keys.

Aspects of the disclosure are to address at least the above-mentioned problems and/or disadvantages and to provide at least the advantages described below. Accordingly, an aspect of the disclosure is to provide a wearable electronic device which has a minimized charging terminal and thus is compact.

Additional aspects will be set forth in part in the description which follows and, in part, will be apparent from the description, or may be learned by practice of the presented embodiments.

Technical Solution

In accordance with an aspect of the disclosure, a wearable electronic device is provided. The wearable electronic device includes a lens frame configured to accommodate a display member and including a first end and a second end opposite to the first end, a hinge structure including a first hinge structure connected to the first end and a second hinge structure connected to the second end, a wearing member including a first wearing member connected to the first hinge structure and a second wearing member connected to the second hinge structure, the first wearing member or the second wearing member being configured to move with respect to the lens frame, a first battery disposed in the first wearing member, a first circuit board disposed in the first wearing member and including first electrodes, and a charging terminal structure disposed in the first wearing member and including first charging pads exposable to an outside, wherein the charging terminal structure includes connecting members arranged in the first wearing member and configured to electrically connect the first charging pads and the first electrodes.

In accordance with another aspect of the disclosure, a wearable electronic device is provided. The wearable electronic device includes a lens frame configured to accommodate a display member and including a first end and a second end opposite to the first end, a hinge connecting structure including a first hinge connecting structure connected to the first end and a second hinge connecting structure connected to the second end, a hinge structure including a first hinge structure connected to the first hinge connecting structure and a second hinge structure connected to the second hinge connecting structure, a wearing member including a first wearing member connected to the first hinge structure and a second wearing member connected to the second hinge structure, the first wearing member or the second wearing member being configured to move with respect to the lens frame, a first battery disposed in the first wearing member, a circuit board disposed in the first wearing member and including electrodes, and a charging terminal structure disposed in the first wearing member and including charging pads exposable to an outside, wherein the charging terminal structure includes a connecting member disposed in the first wearing member and configured to electrically connect the charging pads and the electrodes.

Advantageous Effects

Various embodiments of the disclosure may provide a compact wearable electronic device which has compact physical connection terminal for charging, and which is thus compact.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
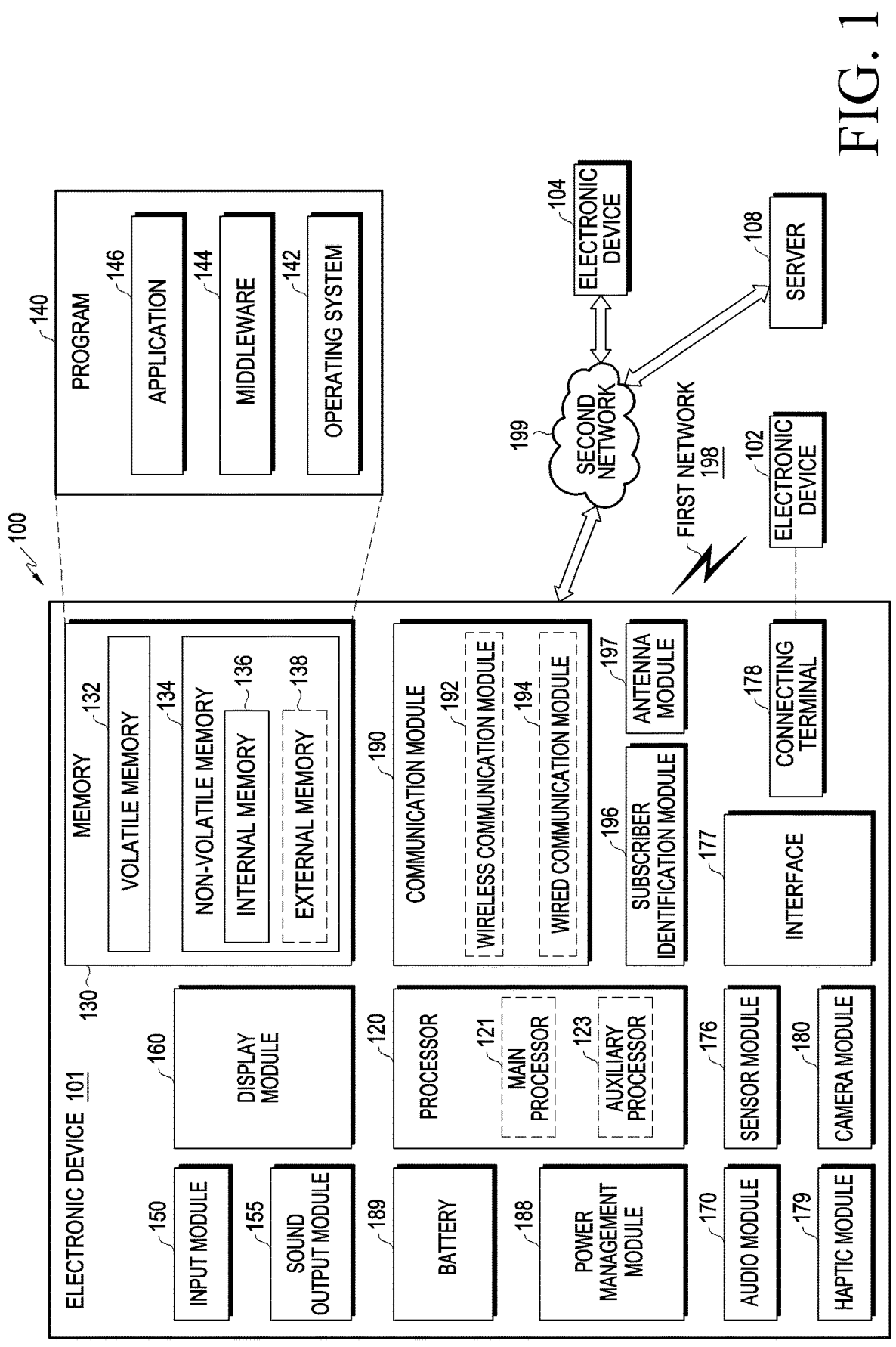
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or rein-forcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recur-rent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide informa-tion to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodi-ment, the audio module 170 may obtain the sound via the input module 150, or output the sound via the sound output module 155 or an external electronic device (e.g., an elec-tronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the elec-tronic device 102) directly or wirelessly. According to an embodiment, the interface 177 may include, for example, a high definition multimedia interface (HDMI), a universal serial bus (USB) interface, a secure digital (SD) card inter-face, or an audio interface.

A connecting terminal 178 may include a connector via which the electronic device 101 may be physically con-nected with the external electronic device (e.g., the elec-tronic device 102). According to an embodiment, the con-necting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
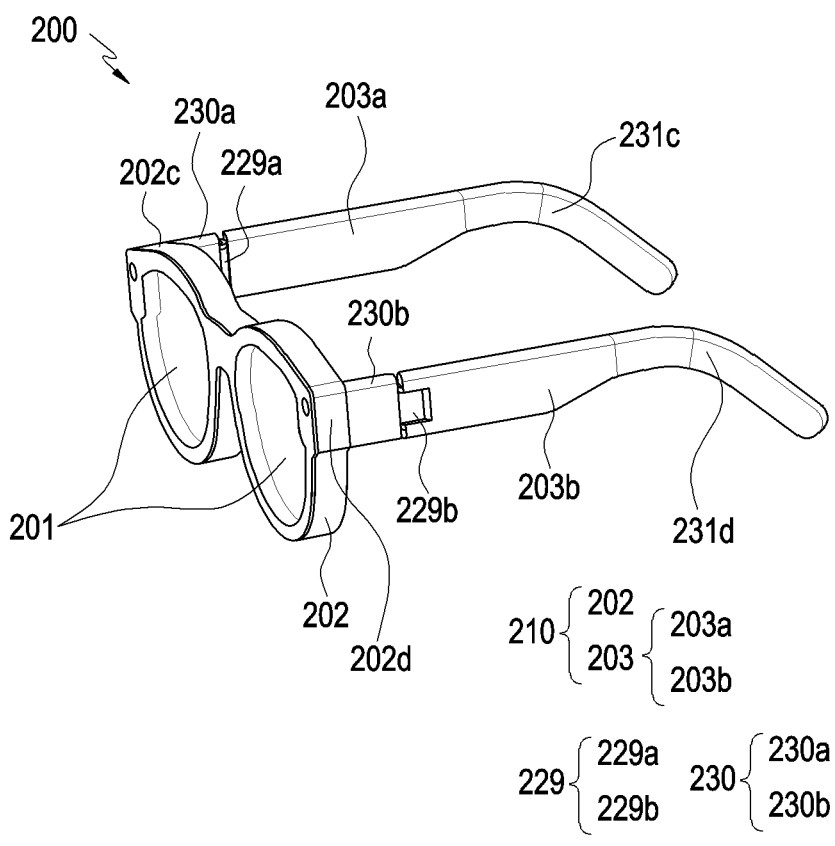
FIG. 2 is a perspective view of a wearable electronic device according to an embodiment of the disclosure.

FIG. 2 is a perspective view of a wearable electronic device according to an embodiment of the disclosure.

Referring to FIG. 2, a wearable electronic device 200 may be an electronic device (e.g., the electronic device 101 of FIG. 1) in the form of eyeglasses, and a user may visually recognize a surrounding object or environment in a state of wearing the wearable electronic device 200. For example, the wearable electronic device 200 may be a head mounted device (HMD) or smart glasses capable of directly providing an image in front of the eyes of a user. The configuration of the wearable electronic device 200 of FIG. 2 may be partially or entirely the same as the configuration of the electronic device 101 of FIG. 1.

According to various embodiments, the wearable electronic device 200 may include a housing 210 configured to form the appearance of the wearable electronic device 200. The housing 210 may be configured to provide a space which enables components of the wearable electronic device 200 to be arranged. For example, the housing 210 may include a lens frame 202 and at least one wearing member 203.

According to various embodiments, the wearable electronic device 200 may include a display member 201 disposed in the housing 210 and capable of outputting a visual image. For example, the wearable electronic device 200 may include at least one display member 201 capable of providing visual information (or image) to a user. For example, the display member 201 may include a module to which a lens, a display, a waveguide, and/or a touch circuit is mounted. According to an embodiment, the display member 201 may be formed to be transparent or translucent. According to an embodiment, the display member 201 may include a glass made of a translucent material or a window member of which the light transmittance can be adjusted as a color concentration thereof is adjusted.

According to various embodiments, the lens frame 202 may be configured to accommodate at least a part of the display member 201. For example, the lens frame 202 may be configured to surround at least a part of the rim of the display member 201. According to an embodiment, the lens frame 202 may be configured to allow the at least one display member 201 to be positioned to correspond to the eyes of a use. According to an embodiment, the lens frame 202 may be a rim having a general eyeglass structure. According to an embodiment, the lens frame 202 may include at least one closed curve configured to surround the display member 201. According to an embodiment, the lens frame 202 may include a first end 202*c* and a second end 202*d* opposite to the first end 202*c*. The first end 202*c* may be disposed adjacent to a first wearing member 203*a*, and the second end 202*d* may be disposed adjacent to a second wearing member 203*b*.

According to various embodiments, the wearing member 203 may be configured to extend from the lens frame 202. For example, the wearing member 203 may be configured to extend from the ends of the lens frame 202, and may be supported or positioned on the body (e.g., ears) of a user together with the lens frame 202. According to an embodiment, the wearing member 203 may be rotatably coupled with respect to the lens frame 202 through a hinge structure 229. According to an embodiment, the wearing member 203 may include an inner surface 231*c* configured face the body of a user and an outer surface 231*d* opposite to the inner surface 231*c*. According to an embodiment (not shown), at least a part of the wearing member 203 may be formed of a flexible material (e.g., rubber). For example, at least a part of the wearing member 203 may be formed in a band shape configured to surround at least a part of the body (e.g., ears) of a user.

According to various embodiments, the wearable electronic device 200 may include the hinge structure 229 configured to allow the wearing member 203 to be folded with respect to the lens frame 202. The hinge structure 229 may be disposed between the lens frame 202 and the wearing member 203. In the state where a user does not wear the wearable electronic device 200, the wearable electronic device may be configured such that the wearing member 203, by a user, is folded to partially overlap with respect to the lens frame 202, thereby being carried or stored. According to an embodiment, the hinge structure 229 may include a first hinge structure 229*a* connected to a part (e.g., the first end 202*c*) of the lens frame 202 and the first wearing member 203*a*, and a second hinge structure 229*b* connected to a part (e.g., the second end 202*d*) of the lens frame 202 and the second wearing member 203*b*.

Figure 3:
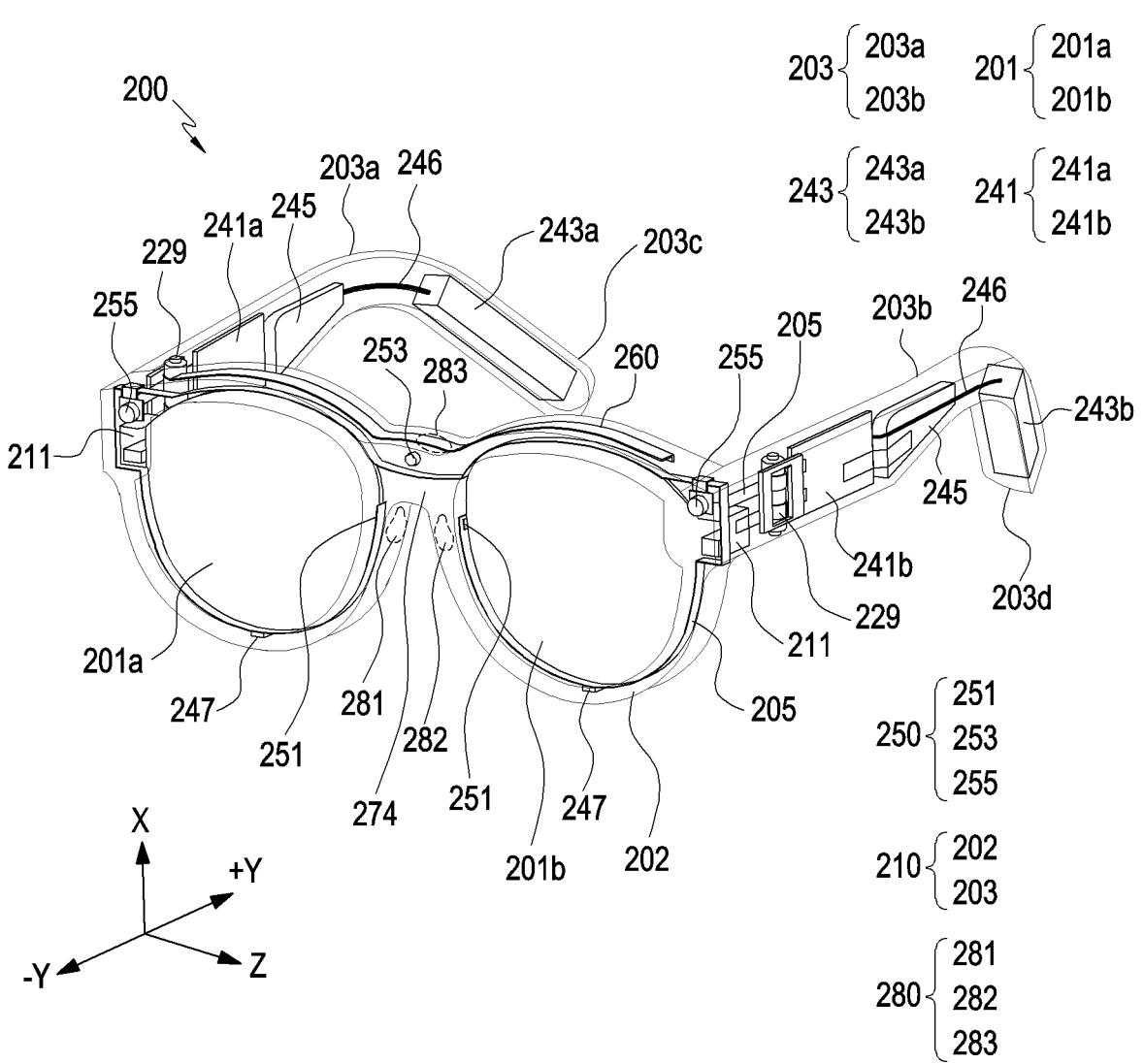
FIG. 3 is a combined perspective view for explaining an internal configuration of a wearable electronic device according to an embodiment of the disclosure.

FIG. 3 is a combined perspective view for explaining an internal configuration of a wearable electronic device according to according to an embodiment of the disclosure of the disclosure.

Figure 4:
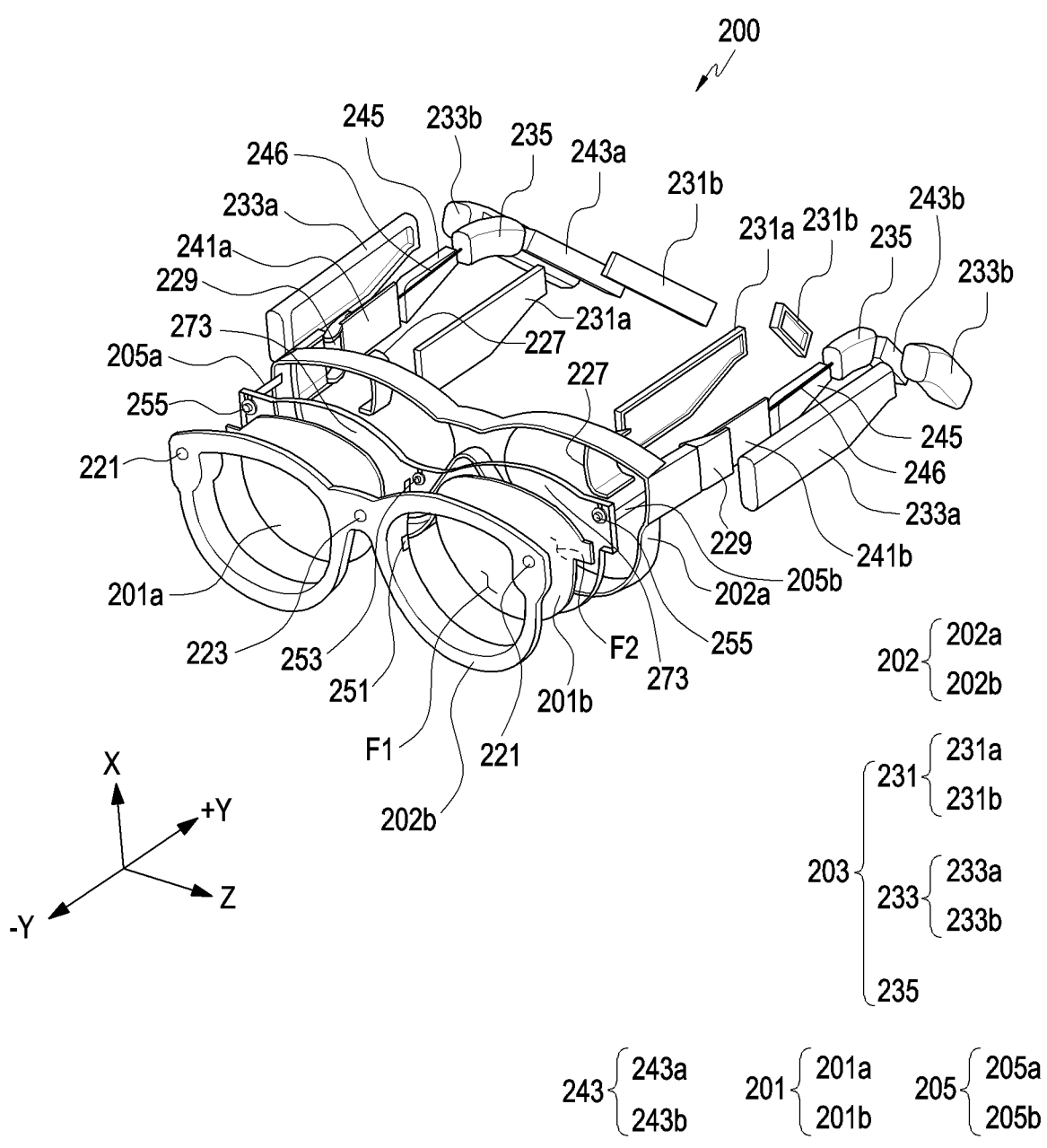
FIG. 4 is an exploded perspective view of a wearable electronic device according to an embodiment of the disclosure.

FIG. 4 is an exploded perspective view of a wearable electronic device according to according to an embodiment of the disclosure.

The configurations of a display member 201, a lens frame 202, a wearing member 203, and a hinge structure 229 of FIG. 3 and/or FIG. 4 may be partially or entirely the same as the configurations of the display member 201, the lens frame 202, the wearing member 203, and the hinge structure 229 of FIG. 2.

Referring to FIGS. 3 and 4, the wearable electronic device 200 may include a display member 201, a lens frame 202, a wearing member 203, a hinge structure 229, at least one circuit board 241, at least one battery 243, at least one power transfer structure 246, a camera module 250, and/or a sensor module 280.

According to various embodiments, the wearable electronic device 200 may be configured to obtain and/or recognize, by using the camera module 250 (e.g., the camera module 180 of FIG. 1), a visual image about an object or environment in a direction (e.g., the −Y-direction) in which a user looks or the wearable electronic device 200 is oriented, and may be configured to receive information on an object or environment from an external electronic device (e.g., the electronic device 102 or 104 of FIG. 1, the server 108 of FIG. 1, or the external electronic device 300 of FIGS. 5A and 5B) through a network (e.g., the first network 198 or the second network 199 of FIG. 1). In another embodiment, the wearable electronic device 200 may be configured to provide the provided information on an object or environment to a user in a sound or visual form. The wearable electronic device 200 may be configured to provide the provided information on an object or environment to a user through the display member 201 in a visual form by using a display module (e.g., the display module 160 of FIG. 1). For example, the wearable electronic device 200 may be configured to implement information on an object or environment in a visual form and then to combine same with an actual image of a surrounding environment of a user, so that the wearable electronic device 200 implements an augmented reality.

According to an embodiment, a pair of the display members 201 may be provided, and in a state where the wearable electronic device 200 is worn on the body of a user, the display members 201 may be arranged to correspond to the left eye and the right eye of a user, respectively. For example, the display member 201 may include a first display member 201*a* and a second display member 201*b* disposed to be spaced apart from the first display member 201*a*. The first display member 201*a* may be disposed to correspond to the right eye of a user, and the second display member 201*b* may be disposed to correspond to the left eye of the user.

According to various embodiments, the display member 201 may include a first surface F1 facing a direction (e.g., the −Y-direction) in which external light is incident, and a second surface F2 facing the direction (e.g., the +Y-direction) opposite to the first surface F1. In a state where a user wears the wearable electronic device 200, at least a part of the light or image having been incident through the first surface F1 may pass through the second surface F2 of the display member 201, which is disposed to face the left eye and/or the right eye of the user, and then may be incident on the left eye and/or the right eye of the user.

According to various embodiments, the lens frame 202 may include at least two frames. For example, the lens frame 202 may include a first frame 202*a* and a second frame 202*b*. According to an embodiment, when a user wears the wearable electronic device 200, the first frame 202*a* may be a frame of a portion facing the face of the user, and the second frame 202*b* may be a part of the lens frame 202, which is spaced apart with respect to the first frame 202*a* in the gaze direction (e.g., the −Y-direction) at which the user is looking.

According to various embodiments, the wearable electronic device 200 may include a light output module 211 configured to provide an image and/or a picture to a user. For example, the light output module 211 may include a display panel (not shown) capable of outputting an image and a lens (not shown) configured to correspond to the eyes of a user and guide the image to the display member 201. For example, a user may obtain an image output from the display panel of the light output module 211 through the lens of the light output module 211. According to various embodiments, the light output module 211 may include a device configured to display various information. For example, the light output module 211 may include at least one of a liquid crystal display (LCD) device, a digital mirror display (DMD) device, a liquid crystal on silicon (LCoS) device, an organic light-emitting diode (OLED), or a micro-light-emitting diode (LED). According to an embodiment, when the light output module 211 and/or the display member 201 includes one of a liquid crystal display device, a digital mirror display device, or a liquid crystal on silicon device, the wearable electronic device 200 may include a light source configured to emit light to a display area of the light output module 211 and/or the display member 201. According to another embodiment, when the light output module 211 and/or the display member 201 includes either an organic light emitting diode or a micro-LED, the wearable electronic device 200 may be configured to provide a virtual image to a user without including a separate light source.

According to various embodiments, at least a part of the light output module 211 may be disposed in the housing 210. For example, the light output module 211 may be connected to the display member 201, and may be configured to provide an image to the user through the display member 201. For example, the image, which is output from the light output module 211, may be incident on the display member 201 through an input optical member (not shown) positioned at one end of the display member 201, and may be emitted toward the eyes of a user through an output optical member (not shown) and a waveguide (not shown) positioned on at least a part of the display member 201.

According to various embodiments, the wearable electronic device 200 may include the circuit board 241 (e.g., a printed circuit board (PCB), a printed board assembly (PBA), a flexible PCB (FPCB), or a rigid-flexible PCB (RFPCB)) configured to accommodate components for driving the wearable electronic device 200. For example, the circuit board 241 may include at least one integrated circuit chip, and at least one of a processor (not shown) (e.g., the processor 120 of FIG. 1), a memory (not shown) (e.g., the memory 130 of FIG. 1), a power management module (not shown) (e.g., the power management module 188 of FIG. 1), or a communication module (not shown) (e.g., the communication module 190 of FIG. 1) may be provided in the integrated circuit chip. According to an embodiment, the circuit board 241 may be disposed in the wearing member 203 of the housing 210. For example, the circuit board 241 may include a first circuit board 241a disposed in the first wearing member 203a and a second circuit board 241b disposed in the second wearing member 203b. According to an embodiment, a communication module (e.g., the communication module 190 of FIG. 1) may be mounted on the first circuit board 241a positioned in the first wearing member 203a, and a processor (e.g., the processor 120 of FIG. 1) may be mounted on the second circuit board 241b positioned in the second wearing member 203b. According to an embodiment, the circuit board 241 may be electrically connected to the battery 243 (e.g., the battery 189 of FIG. 1)

through the power transfer structure 246. According to an embodiment, the circuit board 241 may be an interposer substrate.

According to various embodiments, the battery 243 may be electrically connected to components (e.g., the light output module 211, the circuit board 241, the speaker module 245, the microphone module 247, and/or the camera module 250) of the wearable electronic device 200, and may be configured to supply power to the components of the wearable electronic device 200.

According to various embodiments, at least a part of the battery 243 may be disposed in the wearing member 203. According to an embodiment, the battery 243 may include a first battery 243a disposed in the first wearing member 203a and a second battery 243b disposed in the second wearing member 203b. According to an embodiment, the battery 243 may be disposed adjacent to the ends 203c and 203d of the wearing member 203.

According to various embodiments, the speaker module 245 (e.g., the audio module 170 or the sound output module 155 of FIG. 1) may be configured to convert an electrical signal into a sound. At least a part of the speaker module 245 may be disposed in the wearing member 203 of the housing 210. According to an embodiment, the speaker module 245 may be positioned in the wearing member 203 to correspond to the ears of a user. According to an embodiment (e.g., FIG. 3), the speaker module 245 may be disposed next to the circuit board 241. For example, the speaker module 245 may be disposed between the circuit board 241 and the battery 243. According to another embodiment (not shown), the speaker module 245 may be disposed on the circuit board 241. For example, the speaker module 245 may be disposed between the circuit board 241 and an inner case (e.g., the inner case 231 of FIG. 4).

According to various embodiments, the wearable electronic device 200 may include the power transfer structure 246 configured to transfer power of the battery 243 to an electronic component (e.g., the light output module 211) of the wearable electronic device 200. For example, the power transfer structure 246 may be electrically connected to the battery 243 and/or the circuit board 241, and the circuit board 241 may be configured to deliver the power received through the power transfer structure 246 to the light output module 211. According to an embodiment, the power transfer structure 246 may be a configuration capable of delivering power. For example, the power transfer structure 246 may include a flexible printed circuit board or a wire. For example, the wire may include multiple cables (not shown). In various embodiments, the form of the power transfer structure 246 may be variously modified in consideration of the number and/or the type of cables.

According to various embodiments, the microphone module 247 (e.g., the input module 150 and/or the audio module 170 of FIG. 1) may be configured to convert a sound into an electrical signal. According to an embodiment, the microphone module 247 may be disposed in the lens frame 202. For example, the at least one microphone module 247 may be disposed at the lower end (e.g., in a direction toward the −X-axis) and/or the upper end (e.g., in a direction toward the +X-axis) of the wearable electronic device 200. According to various embodiments, the wearable electronic device 200 may be configured to more clearly recognize the voice of a user by using the voice information (e.g., sound) obtained from the at least one microphone module 247. For example, the electronic device 200 may be configured to distinguish between voice information and an ambient noise, based on the obtained voice information and/or additional information (e.g., a low-frequency vibration of the skin and bone of a user). For example, the wearable electronic device 200 may be configured to clearly recognize the voice of a user, and may be configured to perform a function of reducing an ambient noise (e.g., a noise canceling).

According to various embodiments, the camera module 250 may be configured to photograph a still image and/or a moving image. The camera module 250 may include at least one of a lens, at least one image sensor, an image signal processor, or a flash. According to an embodiment, the camera module 250 may be disposed in the lens frame 202, and may be disposed around the display member 201.

According to various embodiments, the camera module 250 may include at least one first camera module 251. According to an embodiment, the first camera module 251 may be configured to photograph the eyes (e.g., pupil) or the gaze trajectory of a user. For example, the first camera module 251 may include a light-emitting part (e.g., an IR LED) (not shown) configured to emit light of an infrared band, and a camera structure (not shown) configured to photograph a reflection pattern of the light emitted to the eyes of a user by the light-emitting part. According to an embodiment, a processor (e.g., the processor 120 of FIG. 1) may be configured to adjust the position of a virtual image such that the virtual image projected on the display member 201 corresponds to the direction at which the pupils of a user gaze. According to an embodiment, the first camera module 251 may be configured to track the eyes or the gaze trajectory of a user by using multiple first camera modules 251 having an identical specification and performance.

According to an embodiment, the first camera module 251 may be configured to periodically or aperiodically transmit information (e.g., trajectory information) related to the eyes or the gaze trajectory of a user to the processor (e.g., the processor 120 of FIG. 1). According to another embodiment, based on the trajectory information, when it is detected that the gaze of a user has changed (e.g., the eyes move more than the standard value in the state where the head does not move), the first camera module 251 may be configured to transmit the trajectory information to the processor.

According to various embodiments, the camera module 250 may include a second camera module 253. According to an embodiment, the second camera module 253 may be configured to photograph an external image. According to an embodiment, the second camera module 253 may be configured to photograph an external image through a second optical hole 223 formed through the second frame 202*b*. For example, the second camera module 253 may include a high-resolution color camera, and may be a high resolution (HR) or a photo video (PV) camera. According to an embodiment, the second camera module 253 may be configured to provide an auto focus (AF) function and an optical image stabilizer (OIS) function.

According to various embodiments (not shown), the wearable electronic device 200 may include a flash (not shown) positioned adjacent to the second camera module 253. For example, when an external image is obtained by the second camera module 253, the flash (not shown) may be configured to provide light for increasing the brightness (e.g., illuminance) around the wearable electronic device 200, and thus it may be possible to reduce the difficulty of image acquisition due to a dark environment, mixing of various light sources, and/or a light reflection.

According to various embodiments, the camera module 250 may include at least one third camera module 255. According to an embodiment, the third camera module 255 may be configured to photograph a motion of a user through a first optical hole 221 formed through the lens frame 202. For example, the third camera module 255 may be configured to photograph a gesture (e.g., a hand motion) of a user. The third camera module 255 and/or the first optical hole 221 may be arranged in each of opposite side ends of the lens frame 202 (e.g., the second frame 202*b*), for example, each of both ends of the lens frame 202 (e.g., second frame 202*b*) in the Z direction. According to an embodiment, the third camera module 255 may be a global shutter (GS) type camera. For example, the third camera module 255 may be a camera configured to support three degrees of freedom (3DoF) or six degrees of freedom (6DoF), and may be configured to provide 360-degree spatial (e.g., omnidirectional) recognition, position recognition, and/or movement recognition. According to an embodiment, the third camera module 255 may be a stereo camera, and may be configured to perform a simultaneous localization and mapping (SLAM) function and a user motion recognition function by using multiple global shutter cameras having an identical specification and performance. According to an embodiment, the third camera module 255 may include an infrared (IR) camera (e.g., a time of flight (TOF) camera or a structured light camera). For example, an IR camera may be configured to operate as at least a part of a sensor module (e.g., the sensor module 176 of FIG. 1) for detecting a distance to a subject.

According to an embodiment, at least one of the first camera module 251 or the third camera module 255 may be replaced with a sensor module (e.g., the sensor module 176 of FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be interpreted as a photo detector or a photo sensor.

According to an embodiment, at least one of the first camera module 251, the second camera module 253, or the third camera module 255 may include multiple camera modules (not shown). For example, the second camera module 253 may include multiple lenses (e.g., a wide-angle and a telephoto lens) and an image sensor, and may be disposed on one surface (e.g., the surface facing the −Y-direction) of the wearable electronic device 200. For example, the wearable electronic device 200 may include multiple camera modules having different attributes (e.g., a view angle) or functions, and based on a selection of a user and/or trajectory information, may be configured to control so as to change the view angle of the camera module. For example, at least one of the multiple camera modules may be a wide-angle camera, and at least another one thereof may be a telephoto camera.

According to various embodiments, a processor (e.g., the processor 120 of FIG. 1) may be configured to determine a movement of the wearable electronic device 200 and/or a motion of a user by using the information on the wearable electronic device 200, which is obtained using at least one of a gesture sensor, a gyro sensor, or an acceleration sensor of a sensor module (e.g., the sensor module 176 of FIG. 1), and the motion of a user obtained using the third camera module 255 (e.g., the approach of a user's body to the electronic device 200). According to an embodiment, the wearable electronic device 200 may include a magnetic (geomagnetic) sensor capable of measuring the bearing by using a magnetic field and magnetic field lines in addition to the described sensor, and/or a hall sensor capable of obtaining motion information (e.g., a movement direction or a

MINDING THE GAP

17 moving distance) by using a magnetic field strength. For example, the processor may be configured to determine a movement of the electronic device 200 and/or a motion of a user, based on information obtained from the magnetic (geomagnetic) sensor and/or the hall sensor.

According to various embodiments (not shown), the wearable electronic device 200 may be configured to perform an input function (e.g., a touch function and/or a pressure sensing function) capable of interacting with a user. For example, an element (e.g., a touch sensor and/or a pressure sensor), which is configured to perform a touch function and/or a pressure sensing function, may be disposed in at least a part of the wearing member 203. The wearable electronic device 200 may be configured to control a virtual image output through the display member 201, based on information obtained through the element. For example, a sensor, which is related to a touch function and/or a pressure sensing function, may be configured in various types such as a resistive type, a capacitive type, an electromagnetic (EM) type, or an optical type. According to an embodiment, the element, which is configured to perform a touch function and/or a pressure sensing function, may be partially or entirely the same as the configuration of the input module 150 of FIG. 1.

According to various embodiments, the wearable electronic device 200 may include a reinforcing member 260 which is disposed in the inner space of the lens frame 202 and formed to have a rigidity higher than that of the lens frame 202.

According to various embodiments, the electronic device 200 may include a lens structure 273. The lens structure 273 may be configured to refract at least a portion of light. For example, the lens structure 273 may be a prescription lens having a designated refractive power. According to an embodiment, at least a part of the lens structure 273 may be disposed at the rear (e.g., the +Y-direction) of the display member 201. For example, the lens structure 273 may be positioned between the display member 201 and the eyes of a user.

According to various embodiments, the housing 210 may include a hinge cover 227 capable of concealing one portion of the hinge structure 229. Another one portion of the hinge structure 229 may be accommodated or concealed between the inner cover 231 and an outer cover 233 to be described later.

According to various embodiments, the wearing member 203 may include the inner cover 231 and the outer cover 233. For example, the inner cover 231 may be a cover configured to face the body of a user or be in directly contact with the body of the user, and may be made of a material having low thermal conductivity, for example, a synthetic resin. According to an embodiment, the inner cover 231 may include an inner surface (e.g., the inner surface 231c of FIG. 2) facing the body of a user. For example, the outer cover 233 may include a material (e.g., a metal material) capable of delivering heat at least partially, and may be coupled to the inner cover 231 so as to face same. According to an embodiment, the outer cover 233 may include an outer surface (e.g., the outer surface 231d of FIG. 2) opposite to the inner surface 231c. In an embodiment, at least one of the circuit board 241 or the speaker module 245 may be configured to be accommodated in a space separated from the battery 243 in the wearing member 203. In the illustrated embodiment, the inner cover 231 may include a first cover 231a configured to accommodate the circuit board 241 and/or the speaker module 245, and a second cover 231b configured to accommodate the battery 243, and the outer cover 233 may include a third cover 233a coupled to face the first cover 231a and a fourth cover 233b coupled to face the second cover 231b. For example, the first cover 231a and the third cover 233a (hereinafter, a 'first cover portion 231a and 233a') may be coupled to each other to accommodate the circuit board 241 and/or the speaker module 245, and the second cover 231b and the fourth cover 233b (hereinafter, a 'second cover portion 231b and 233b') may be coupled to each other to accommodate the battery 243.

According to various embodiments, the first cover portion 231a and 233a may be rotatably coupled to the lens frame 202 through the hinge structure 229, and the second cover portion 231b and 233b may be connected or mounted to the end of the first cover portion 231a and 233a through a connecting structure 235. According to an embodiment, a portion of the connecting structure 235, which is in contact with the body of a user, may be made of a material having low thermal conductivity, for example, silicone, polyurethane, or an elastic material such as rubber, and a portion thereof, which does not come into contact with the body of the user, may be made of a material (e.g., a metal material) having high thermal conductivity. For example, when heat is generated from the circuit board 241 or the battery 243, the connecting structure 235 may be configured to block heat delivery to the portion in contact with the body of the user, and to disperse or release heat through the portion not in contact with the body of the user. According to an embodiment, the portion of the connecting structure 235, which is configured to come into contact with the body of a user, may be interpreted as a part of the inner cover 231, and the portion of the connecting structure 235, which does not come into contact with the body of the user, may be interpreted as a part of the outer cover 233. According to an embodiment (not shown), the first cover 231a and the second cover 231b may be integrally formed without the connecting structure 235, and the third cover 233a and the fourth cover 233b may be integrally formed without the connecting structure 235. According to various embodiments, the wearable electronic device may further include other components (e.g., the antenna module 197 of FIG. 1) in addition to the illustrated components, and may be configured to receive, by using a communication module (e.g., the communication module 190 of FIG. 1), information on an object or an environment provided from an external electronic device (e.g., the electronic device 102 or 104 of FIG. 1, the server 108 of FIG. 1, or the external electronic device 300 of FIGS. 5A and 5B) through a network (e.g., the first network 198 or second network 199 of FIG. 1).

According to an embodiment, the lens frame 202 may include a connecting structure portion 274 between the first display member 201a and the second display member 201b. For example, the connecting structure portion 274 may be interpreted as a portion corresponding to the nose support part of eyeglasses.

According to various embodiments, the electronic device 200 may include a connection member 205. According to an embodiment, the circuit board 241 may be connected to the connection member 205, and may be configured to deliver an electrical signal to components (e.g., the light output module 211 and/or the camera 250) of the electronic device 200 through the connection member 205. For example, a control signal delivered from a processor (e.g., the processor 120 of FIG. 1) positioned on the circuit board 241 may be delivered to electronic components by using at least a part of the connection member 205. For example, at least a part of the connection member 205 may include a wire (not shown) electrically connected to components of the electronic device 200.

According to various embodiments, the connection member 205 may include a first connection member 205a of which at least a part is disposed in the first wearing member 203a, and a second connection member 205b of which at least a part is disposed in the second wearing member 203b. According to an embodiment, at least a part of the first connection member 205a and/or the second connection member 205b may be configured to face the hinge structure 229. For example, the first connection member 205a may be configured to cross the hinge structure 229 from the first circuit board 241a so as to extend to the inside of the lens frame 202. The second connection member 205b may be configured to cross the hinge structure 229 from the second circuit board 241b so as to extend to the inside of the lens frame 202. For example, a part of the first connection member 205a and a part of the second connection member 205b may be arranged in the wearing member 203, and another part of each thereof may be arranged in the lens frame 202.

According to an embodiment, each of the first connection member 205a and the second connection member 205b may include a structure which can be folded or unfolded based on the rotation of the hinge structure 229. For example, the first connection member 205a and/or the second connection member 205b may include a flexible printed circuit board (FPCB). According to an embodiment, the first connection member 205a may be electrically and/or mechanically connected to the first circuit board 241a. According to an embodiment, the second connection member 205b may be electrically and/or mechanically connected to the second circuit board 241b. According to an embodiment, each of the first connection member 205a and/or the second connection member 205b may include a structure (e.g., a wire and/or a cable) for delivering a signal.

According to various embodiments, the sensor module 280 (e.g., the sensor module 176 of FIG. 1) may be configured to detect light having passed through the display member 201. According to an embodiment, the sensor module 280 may include a first sensor module 281 capable of detecting light having passed through the first display member 201a, and a second module 282 capable of detecting light having passed through the second display member 201b. For example, the first sensor module 281 may be configured to detect light at the rear (e.g., the +Y-direction) of the first display member 201a, and the second sensor module 282 may be configured to detect light at the rear of the second display member 201b. According to an embodiment, the sensor module 280 may include a third sensor module 283 capable of detecting the light at the front (e.g., the −Y-direction) the display member 201. For example, the third sensor module 283 may be configured to detect light at the front (e.g., the −Y-direction) of the display member 201. According to an embodiment, the sensor module 280 may be an illuminance sensor. According to an embodiment, the third sensor module 283 may have a configuration partially or entirely the same as that of the second camera module 253.

Figure 5A:
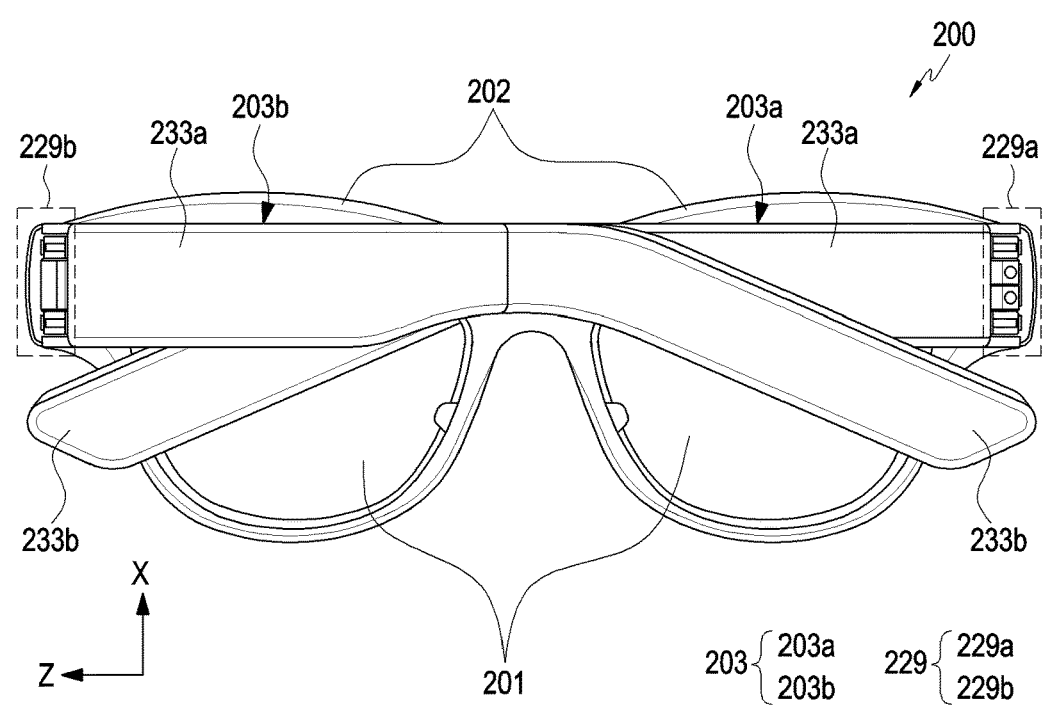
FIG. 5A illustrates a rear view of the wearable electronic device in a first folded state, which is seen from the side of a wearing member, according to an embodiment of the disclosure.
Figure 5B:
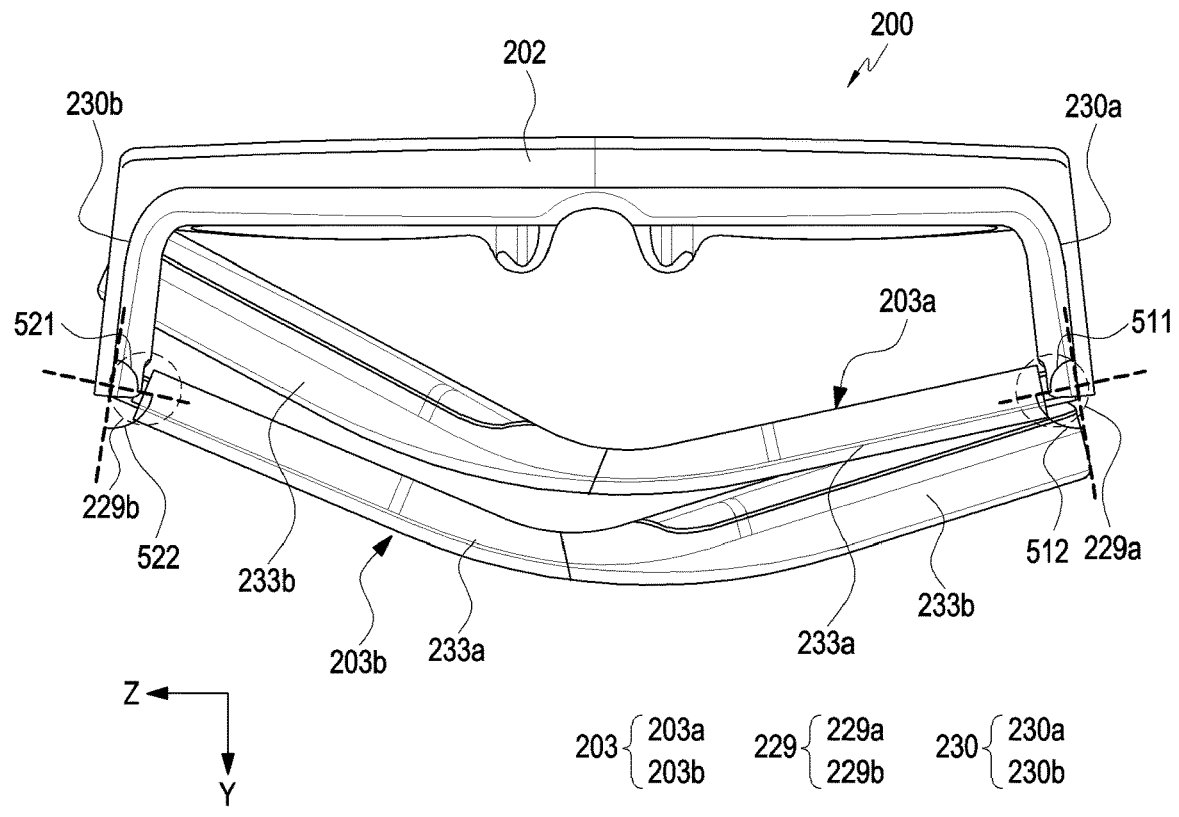
FIG. 5B illustrates a plan view of a wearable electronic device in a first folded state, which is seen from thereabove, according to an embodiment of the disclosure.

FIG. 5A illustrates a rear view of the wearable electronic device in a first folded state, which is seen from the side of a wearing member, according to an embodiment of the disclosure, and FIG. 5B illustrates a plan view of a wearable electronic device in a first folded state, which is seen from thereabove, according to an embodiment of the disclosure.

Figure 6A:
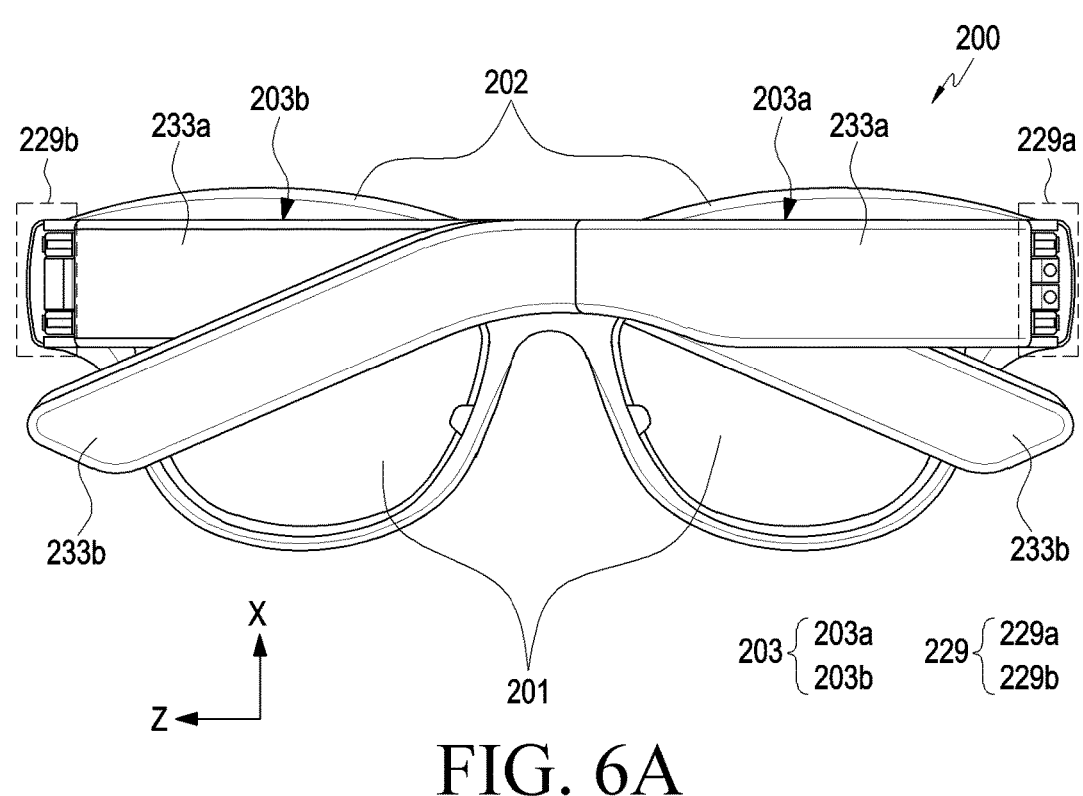
FIG. 6A illustrates a rear view of the wearable electronic device in a second folded state, which is seen from the side of a wearing member, according to an embodiment of the disclosure.
Figure 6B:
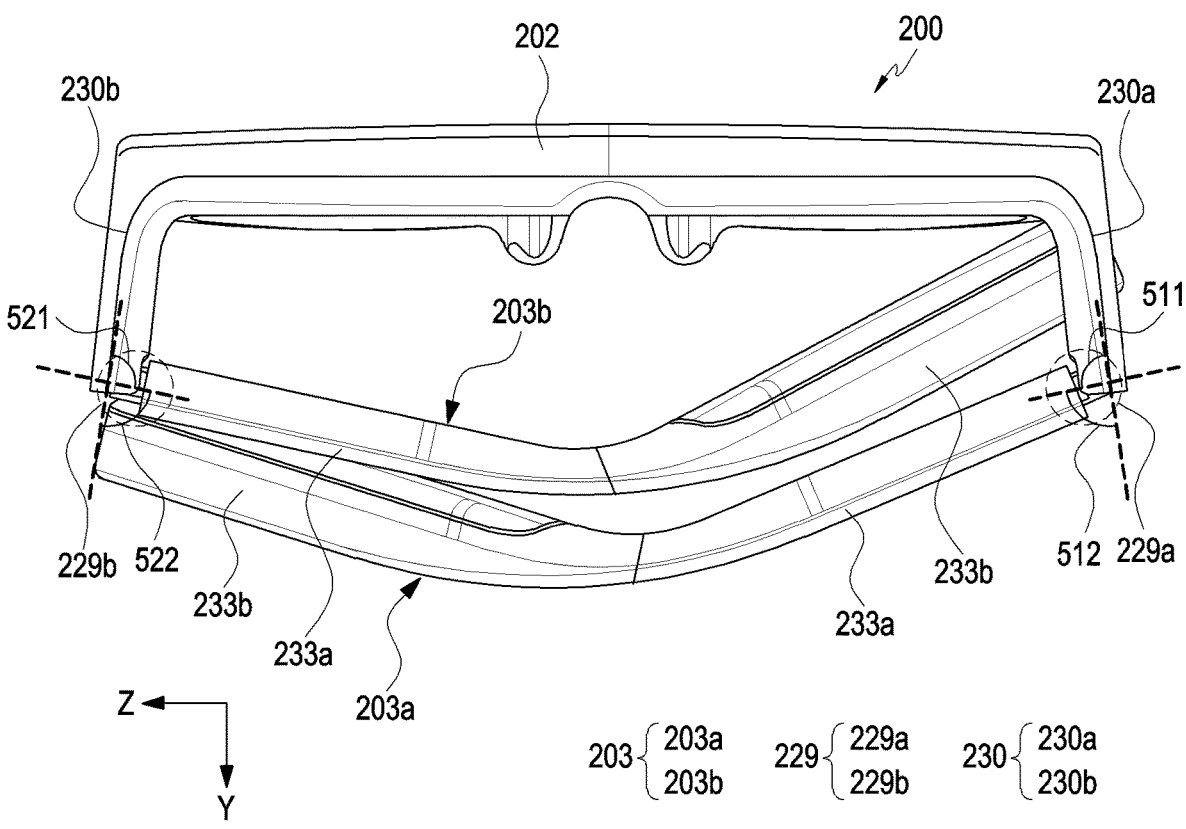
FIG. 6B illustrates a plan view of a wearable electronic device in a second folded state, which is seen from thereabove, according to an embodiment of the disclosure.

FIG. 6A illustrates a rear view of the wearable electronic device in a second folded state, which is seen from the side of a wearing member, according to an embodiment of the disclosure, and FIG. 6B illustrates a plan view of a wearable electronic device in a second folded state, which is seen from thereabove, according to an embodiment of the disclosure.

A wearable electronic device 200, a display member 201, a lens frame 202, a wearing member 203, a hinge structure 229, and an outer cover 233 disclosed in FIGS. 5A, 5B, 6A, and 6B may have configurations the same as or similar to those of the wearable electronic device 200, the display member 201, the lens frame 202, the wearing member 203, the hinge structure 229, and the outer cover 233 disclosed in FIGS. 2, 3, and 4. Accordingly, descriptions of the same configurations may be omitted.

Referring to FIGS. 5A, 5B, 6A, and 6B, according to various embodiments, a relative position between the lens frame 202 and the wearing member 203 of the wearable electronic device 200 may be changed. The wearing member 203 may include the first wearing member 203a and the second wearing member 203b. The first wearing member 203a and the second wearing member 203b may have changeable relative positions with respect to the lens frame 202. According to an embodiment, the first wearing member 203a and the second wearing member 203b may be configured to be provided as an unfolded state (a first state) which is disposed to be parallel to a direction (the Y-axis direction) substantially perpendicular to the longitudinal direction (the Z-axis direction) of the lens frame 202. According to an embodiment, the first wearing member 203a and the second wearing member 203b may be configured to be provided as a folded state (a second state) which is disposed to be substantially parallel to the longitudinal direction (the Z-axis direction) of the lens frame 202.

According to various embodiments, the first wearing member 203a and the second wearing member 203b may change from an unfolded state (the first state) to a folded state (the second state), the order, in which the first wearing member and the second wearing member are changed to the folded state (the second state), may be different. For example, as illustrated in FIG. 5B, the first wearing member 203a may first change to a folded state (the second state), and as another example, as illustrated in FIG. 6B, the second wearing member 203b may first change to a folded state (the second state).

According to various embodiments, the first wearing member 203a and the second wearing member 203b may be unfolded or folded around the hinge structure 229. The hinge structure 229 may include a first hinge structure 229a and a second hinge structure 229b.

According to various embodiments, the first wearing member 203a may be connected to the first hinge structure 229a, and the second wearing member 203b may be connected to the second hinge structure 229b.

According to various embodiments, the first hinge structure 229a and the second hinge structure 229b may be arranged to be spaced apart from the display member 201 by a predetermined distance in the Y-axis direction. The hinge connecting structure 230 may include a first hinge connecting structure 230a and a second hinge connecting structure 230b. The first hinge structure 229a may be fixed to the lens frame 202 by the first hinge connecting structure 230a, and the second hinge structure 229b is fixed to the lens frame 202 by the second hinge connecting structure 230b.

Referring to FIGS. 5A and 5B, according to various embodiments, it may be identified that the first wearing member 203a in an unfolded state (the first state) first changes to the folded state (the second state), and then the second wearing member 203b in the unfolded state (the first state) changes to the folded state (second state). Accordingly, the first wearing member 203a may be disposed closer to the lens frame 202 than the second wearing member 203b. As the first wearing member 203a is disposed closer to the lens frame 202 than the second wearing member 203b, a first external angle 512 formed by the lens frame 202 and the first wearing member 203a may be formed to be greater than the second external angle 522 formed by the lens frame 202 and the second wearing member 203b. Likewise, the first internal angle 511 formed by the lens frame 202 and the first wearing member 203a may be formed to be smaller than the second internal angle 521 formed by the lens frame 202 and the second wearing member 203b.

Referring to FIGS. 6A and 6B, according to various embodiments, it may be identified that the second wearing member 203b in an unfolded state (the first state) first changes to the folded state (the second state), and then the first wearing member 203a in the unfolded state (the first state) changes to the folded state (second state). Accordingly, the second wearing member 203b may be disposed closer to the lens frame 202 than the first wearing member 203a. As the second wearing member 203b is disposed closer to the lens frame 202 than the first wearing member 203a, the first external angle 512 formed by the lens frame 202 and the first wearing member 203a may be formed to be smaller than the second external angle 522 formed by the lens frame 202 and the second wearing member 203b. Likewise, the first internal angle 511 formed by the lens frame 202 and the first wearing member 203a may be formed to be greater than the second internal angle 521 formed by the lens frame 202 and the second wearing member 203b.

According to various embodiments, according to the order in which the first wearing member 203a and the second wearing member 203b are folded, the first external angle 512 or the first internal angle 511 formed by the first wearing member 203a and the lens frame 202, and the second external angle 522 or the second internal angle 521 formed by the second wearing member 203b and the lens frame 202 may be changed.

Figure 7A:
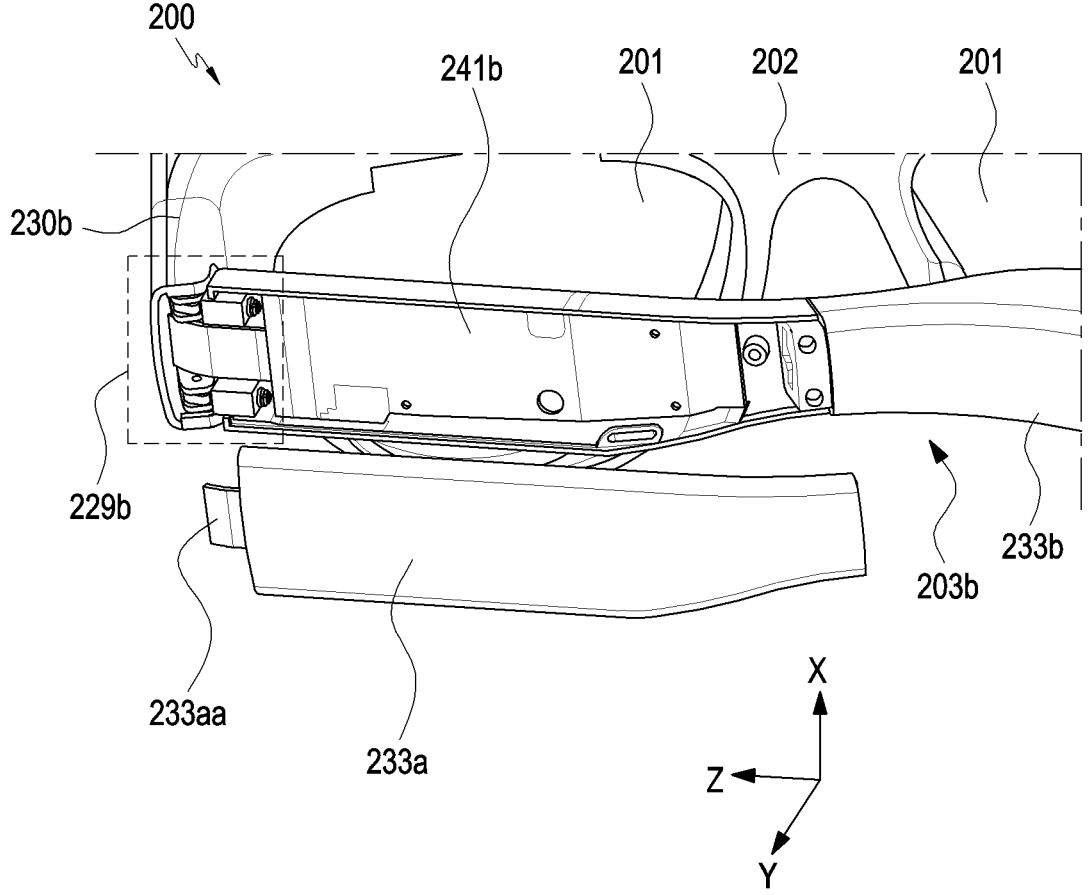
FIG. 7A is a perspective view of a second wearing member in a folded state (a second state), from which the third cover is separated, according to an embodiment of the disclosure.
Figure 7B:
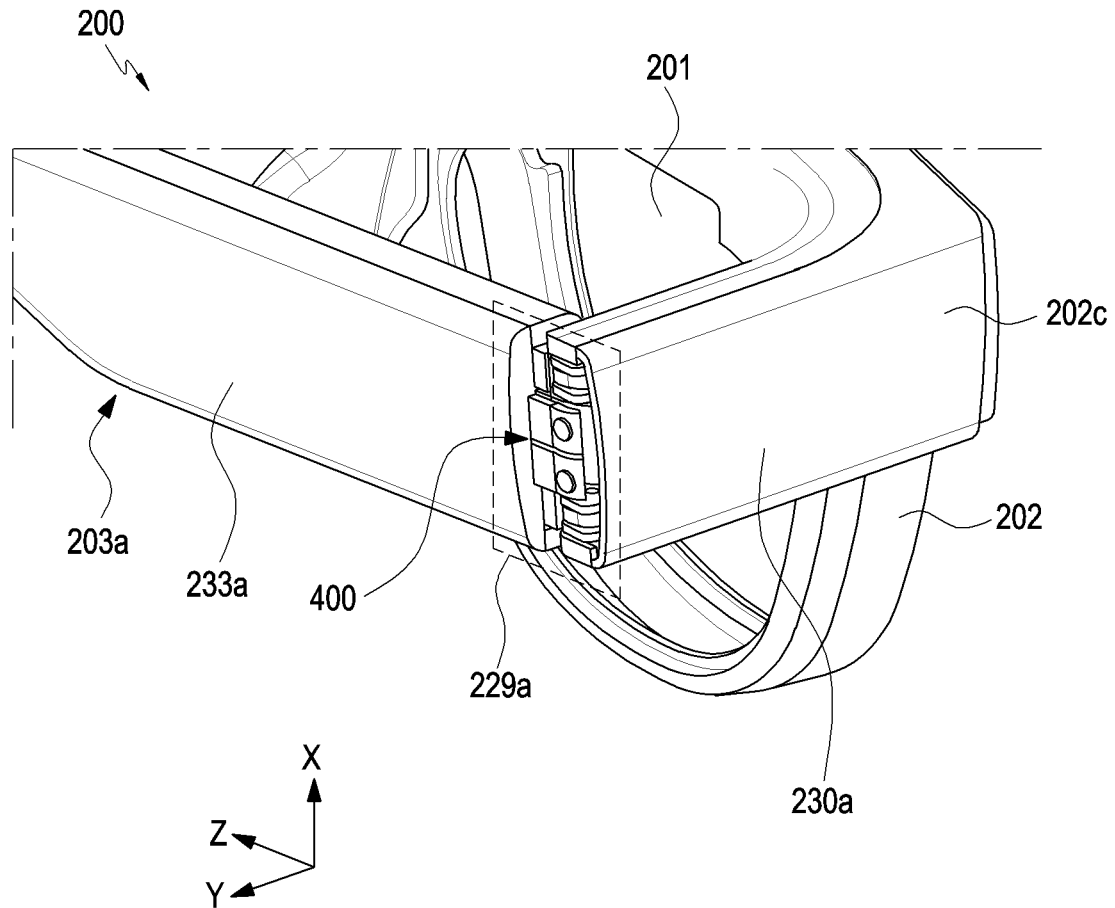
FIG. 7B is a perspective view of a first wearing member in a folded state (a second state) according to an embodiment of the disclosure.
Figure 7C:
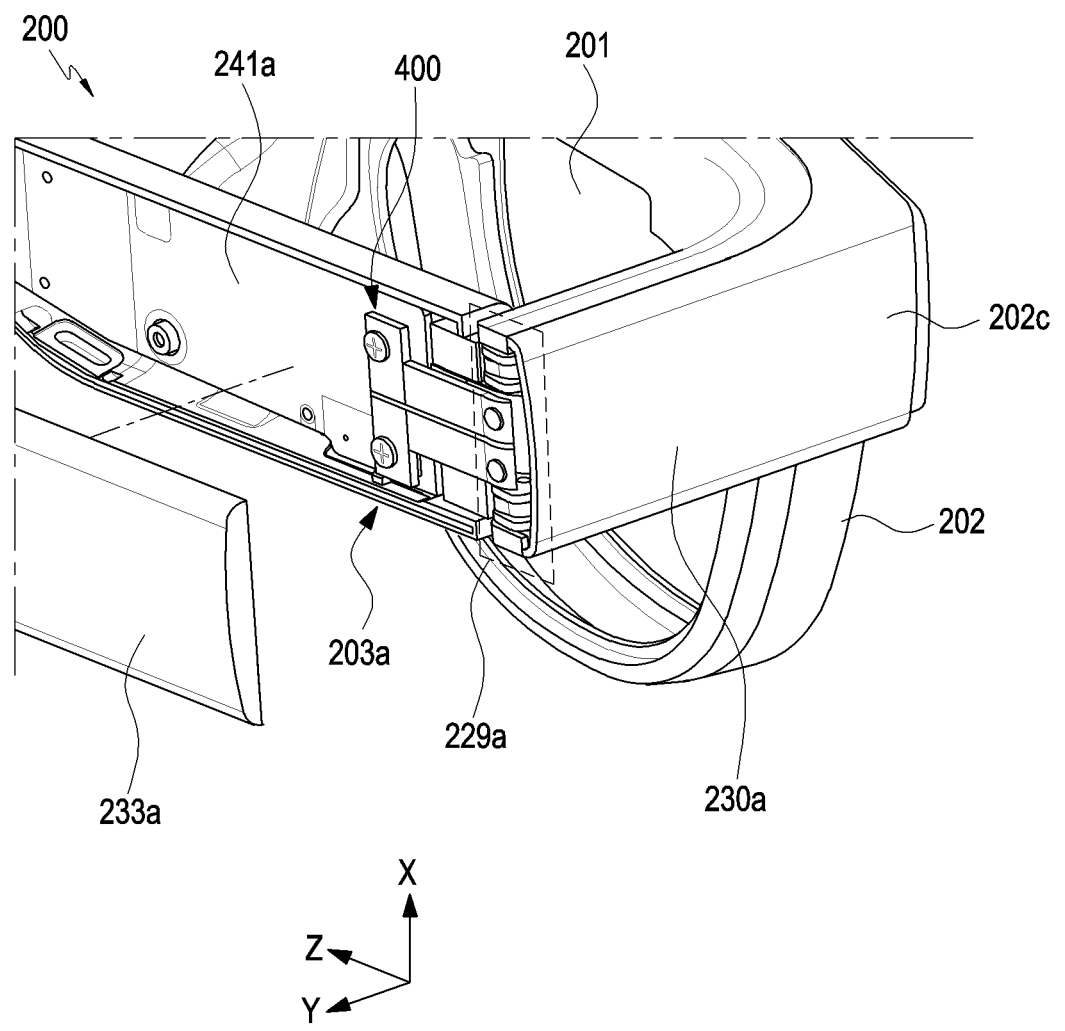
FIG. 7C is a perspective view of a first wearing member in a folded state (a second state), from which the third cover is separated, according to an embodiment of the disclosure.
Figure 7D:
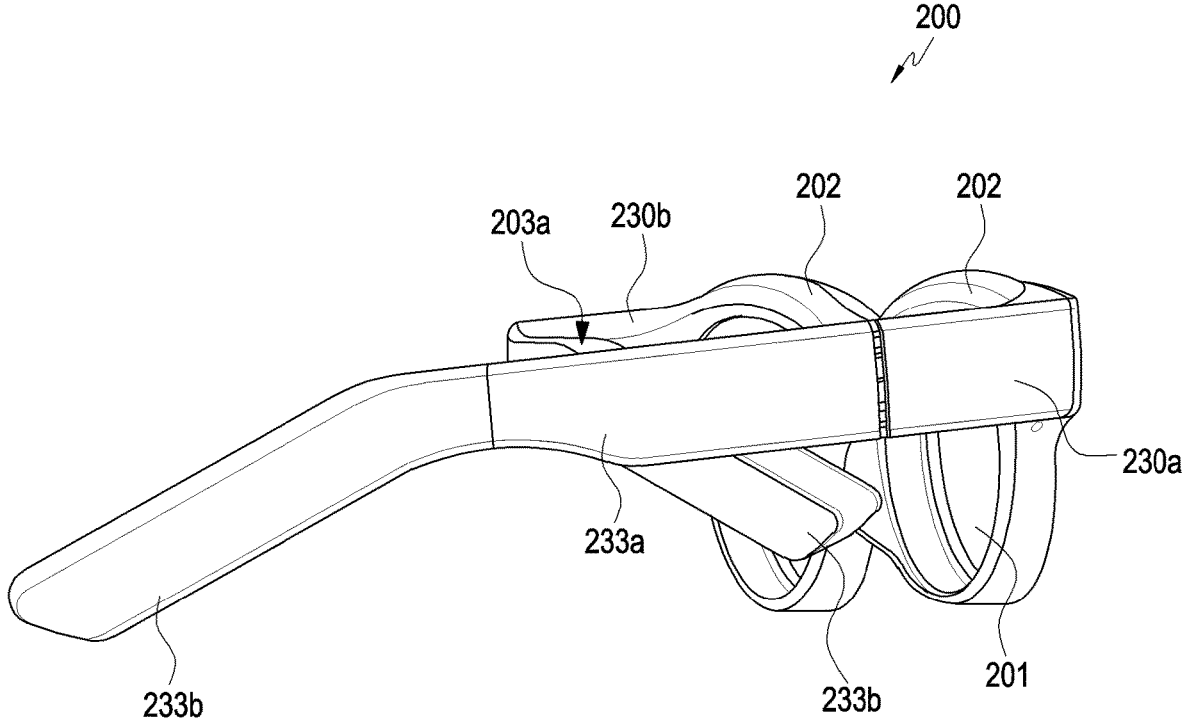
FIG. 7D is a perspective view of a first wearing member in an unfolded state (a first state) according to an embodiment of the disclosure.
Figure 7E:
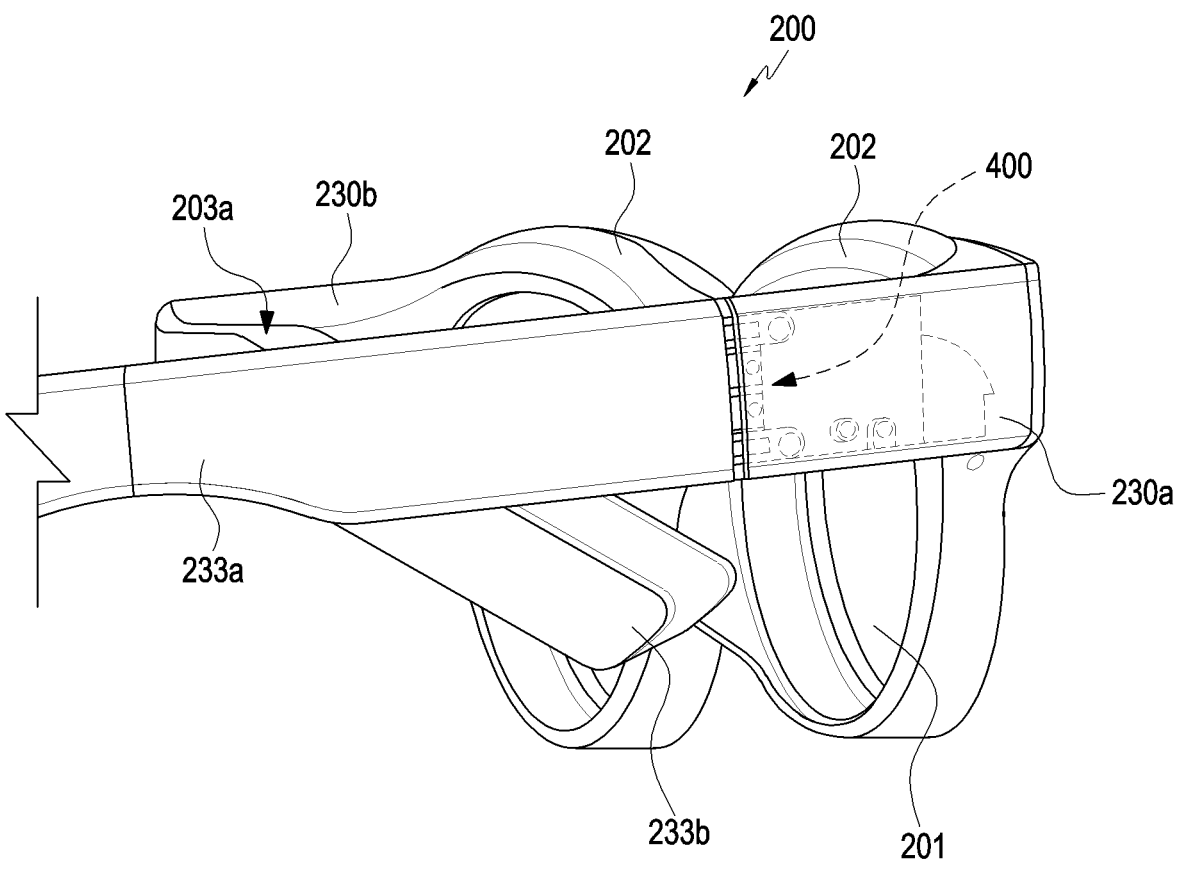
FIG. 7E is an enlarged transparent perspective view of a first wearing member in an unfolded state (a first state) according to an embodiment of the disclosure.
Figure 7F:
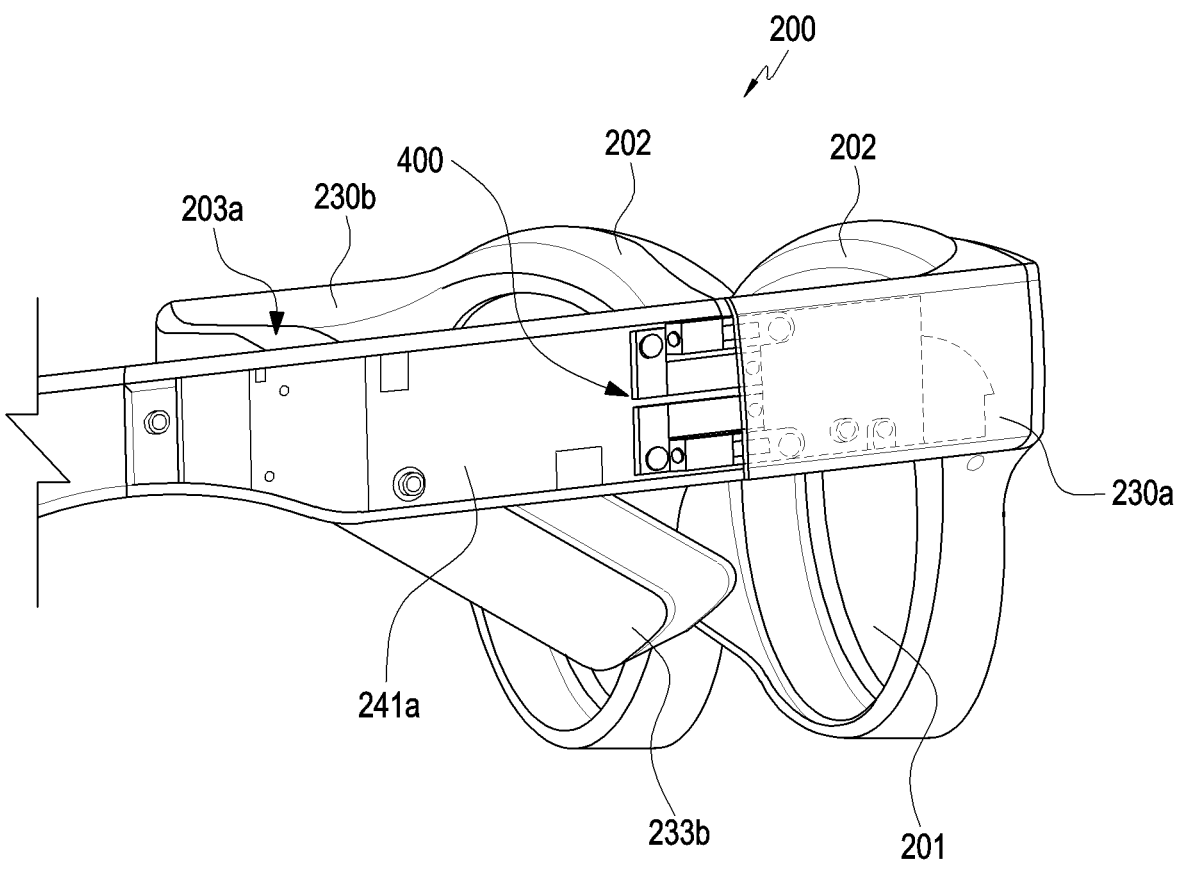
FIG. 7F is a perspective view of a first wearing member in an unfolded state (a first state), from which a third cover is separated, according to an embodiment of the disclosure.

FIG. 7A is a perspective view of a second wearing member in a folded state (a second state), from which the third cover is separated, according to an embodiment of the disclosure, FIG. 7B is a perspective view of a first wearing member in a folded state (a second state) according to an embodiment of the disclosure, FIG. 7C is a perspective view of a first wearing member in a folded state (a second state), from which the third cover is separated, according to an embodiment of the disclosure, FIG. 7D is a perspective view of a first wearing member in an unfolded state (a first state) according to an embodiment of the disclosure, FIG. 7E is an enlarged transparent perspective view of a first wearing member in an unfolded state (a first state) according to an embodiment of the disclosure, and FIG. 7F is a perspective view of a first wearing member in an unfolded state (a first state), from which a third cover is separated, according to an embodiment of the disclosure.

A wearable electronic device 200, a display member 201, a lens frame 202, a first end 202c, a first wearing member 203a, a second wearing member 203b, a first hinge structure 229a, a second hinge structure 229b, a first hinge connecting structure 230a, a second hinge connecting structure 230b, a third cover 233a, a first circuit board 241a, and a second circuit board 241b, which are disclosed in FIGS. 7A, 7B, 7C, 7D, 7E, and 7F, may have configurations the same as or similar to those of the wearable electronic device 200, the display member 201, the lens frame 202, the first end 202c, the first wearing member 203a, the second wearing member 203b, the first hinge structure 229a, the second hinge structure 229b, the first hinge connecting structure 230a, the second hinge connecting structure 230b, the third cover 233a, the first circuit board 241a, and the second circuit board 241b which are disclosed in FIGS. 2, 3, 4, 5A, 5B, 6A, and 6B. Accordingly, descriptions of the same configurations may be omitted.

Referring to FIG. 7A, according to various embodiments, the second circuit board 241b may be disposed in the second wearing member 203b. According to an embodiment, the second circuit board 241b may be disposed to be covered by the third cover 233a.

According to various embodiments, the third cover 233a may have a third cover protrusion 233aa formed at one end thereof, which is the side of the second hinge structure 229b. As the third cover protrusion 233aa is formed at the third cover 233a, components arranged on the second wearing member 203b in a folded state (the second state) may be covered by the third cover protrusion 233aa. For example, the second hinge structure 229b may be protected by the third cover protrusion 233aa.

Referring to FIGS. 7B and 7C, according to various embodiments, the first circuit board 241a may be disposed in the first wearing member 203a. According to an embodiment, the first circuit board 241a may be disposed to be covered by the third cover 233a.

According to various embodiments, a charging terminal structure 400 may be disposed on the first circuit board 241a. At least a part of the charging terminal structure 400 may be disposed to be electrically connected to the first circuit board 241a. A detailed description of the first circuit board 241a and the charging terminal structure 400 will be described later along with the description of FIG. 8.

Referring to FIGS. 7D, 7E, and 7F, according to various embodiments, a first wearing member (e.g., the first wearing member 203a of FIG. 2) may include the first circuit board 241a. In the first wearing member 203a in an unfolded state (the first state), the first circuit board 241a may be disposed so as not to be exposed to the outside. According to an embodiment, at least a part of the first circuit board 241a may be disposed to be covered by the third cover 233a. According to an embodiment, at least a part of the first circuit board 241a may be disposed to be covered by the first hinge connecting structure 230a. The first circuit board 241a may be configured to be connected to the charging terminal structure 400. The charging terminal structure 400 may be disposed so as not exposed to the outside in a state (the first state) in which the first wearing member 203a is unfolded. According to an embodiment, at least a part of the charging terminal structure 400 may be disposed to be covered by the first hinge connecting structure 230a and/or the third cover 233a. The charging terminal structure 400 will be described later along with the description of FIG. 8.

Figure 8:
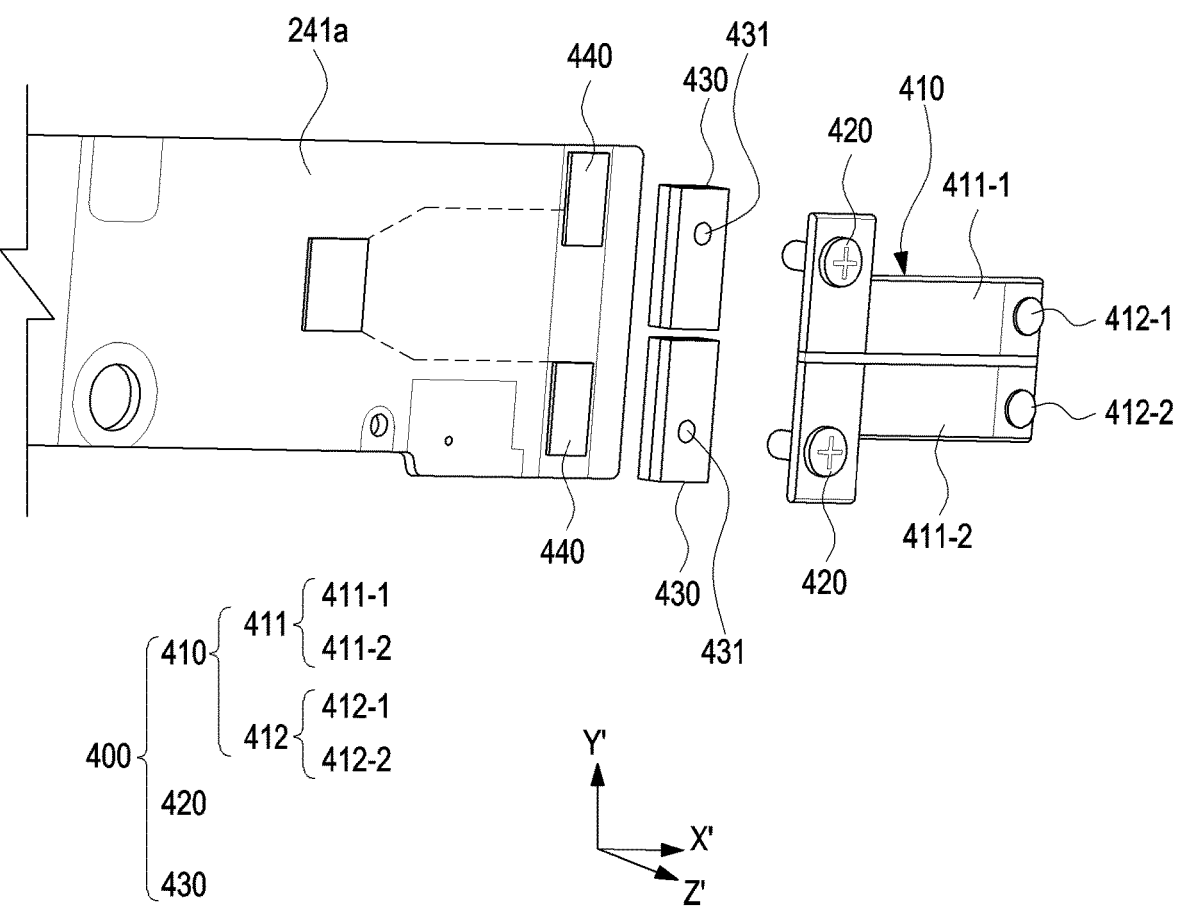
FIG. 8 is a perspective view of a first circuit board and a charging terminal structure according to an embodiment of the disclosure.

FIG. 8 is a perspective view of a first circuit board and a charging terminal structure according to an embodiment of the disclosure.

A first circuit board 241a disclosed in FIG. 8 may be the same as or similar to the first circuit board 241a disclosed in FIG. 7C. Accordingly, descriptions of the same configurations may be omitted.

According to various embodiments, at least a pair of electrodes 440 may be disposed on the first circuit board 241a. The electrode 440 may be connected to a charging circuit disposed on the first circuit board 241a, and a battery (e.g., the battery 243 of FIG. 3), which is disposed in the wearable electronic device 200, may be charged from an external power source through the electrodes 440. The pair of electrodes 440 may be spaced apart from each other and arranged on the first circuit board 241a.

According to various embodiments, the charging terminal structure 400 may include a pad part 410, a fixing member 420, and a connecting member 430.

According to various embodiments, the pad part 410 may include multiple charging pads 411. According to an embodiment, the pad part 410 may include a pair of charging pads 411. According to an embodiment, the charging pads 411 may include a first charging pad 411-1 and a second charging pad 411-2. The first charging pad 411-1 and the second charging pad 411-2 may be formed to be spaced apart from each other. According to another embodiment, the first charging pad 411-1 and the second charging pad 411-2 may be formed so as not to be electrically connected to each other.

According to various embodiments, a seating portion 412 may be formed on one end of the charging pad 411. The seating portion 412 may include a first seating portion 412-1 and a second seating portion 412-2. According to an embodiment, the first seating portion 412-1 may be formed on one end of the first charging pad 411-1, and the second seating portion 412-2 may be formed on one end of the second charging pad 411-2. The seating portion 412 may be connected to an external electrode (e.g., the external electrode 450 of FIGS. 9A and 9B) to receive power supplied from the outside.

According to various embodiments, a fixing member 420 may be disposed at the other end of the charging pad 411. A hole may be formed through the other end of each of the charging pads 411, and at least a part of the fixing member 420 may be disposed to pass through the hole formed through the other end of the charging pad 411. The fixing member 420 may be connected to the connecting member 430. The fixing member 420 may be formed as a screw.

According to various embodiments, the connecting member 430 may be connected to the fixing member 420. A connecting hole 431 may be formed through the connecting member 430. At least a part of the fixing member 420 may be inserted into the connecting hole 431 formed through the connecting member 430, and thus the fixing member 420 and the connecting member 430 may be coupled to each other to be electrically connected.

According to various embodiments, the connecting member 430 may be disposed to be connected to the electrode 440 disposed on the first circuit board 241a. As the connecting member 430 and the electrode 440 are connected, the electrode 440, which is disposed on the first circuit board 241a, may be electrically connected to the external electrode 450 through the connecting member 430, the fixing member 420, the charging pad 411, and the seating portion 412. Accordingly, the first circuit board 241a may be configured to receive power supplied from an external power source. In addition, as the electrode 440, the connecting member 430, the fixing member 420, and the charging pad 411 are arranged at a position corresponding to a third cover protrusion (the third cover protrusion 233aa of FIG. 7A), the volume of the wearable electronic device 200 may be reduced.

According to various embodiments, the charging terminal structure 400 may not be limited to being disposed only in the first wearing member 203a, the charging terminal structure 400 may be disposed in the second wearing member 203b, and also may be disposed in both the first wearing member 203a and the second wearing member 203b.

Figure 9A:
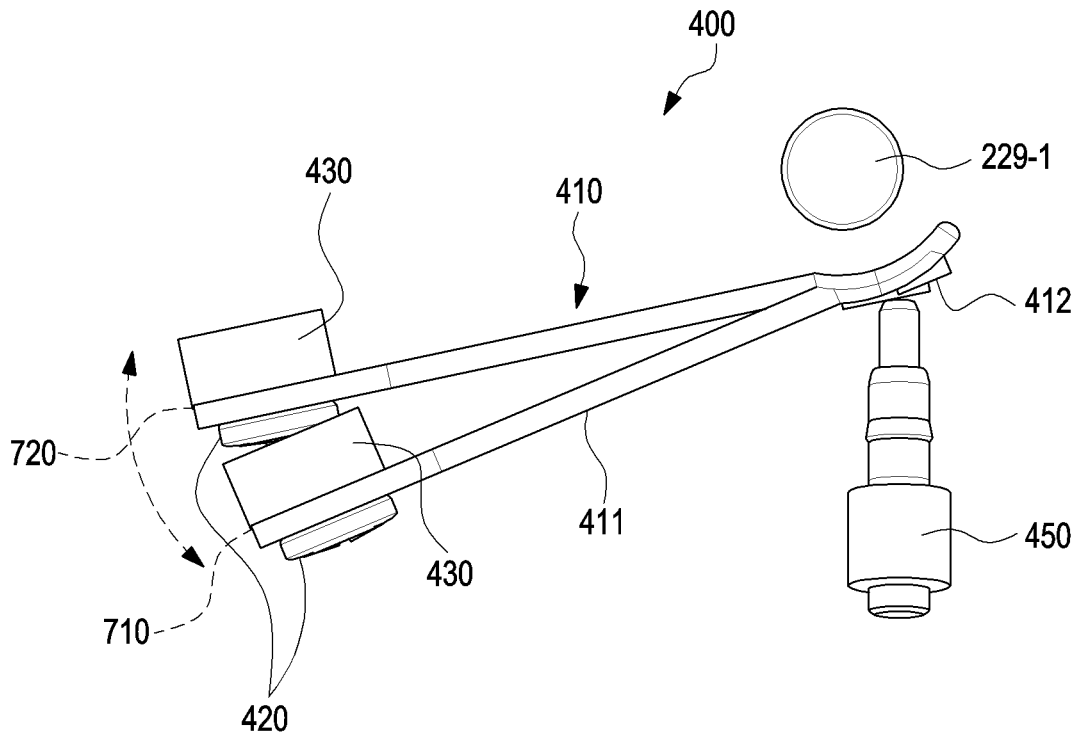
FIG. 9A is a plan view of a charging terminal structure, an external electrode, and a hinge shaft according to an embodiment of the disclosure.
Figure 9B:
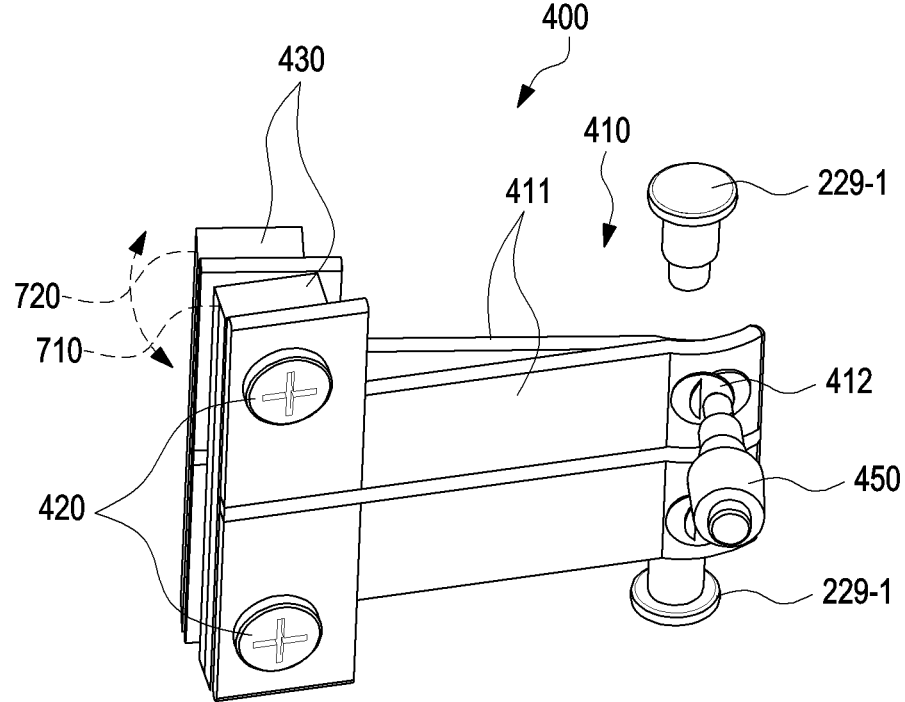
FIG. 9B is a perspective view of a charging terminal structure, an external electrode, and a hinge shaft according to an embodiment of the disclosure.

FIG. 9A is a plan view of a charging terminal structure, an external electrode, and a hinge shaft according to an embodiment of the disclosure, and FIG. 9B is a perspective view of a charging terminal structure, an external electrode, and a hinge shaft according to an embodiment of the disclosure.

A charging terminal structure 400, a pad part 410, a charging pad 411, a seating portion 412, a fixing member 420, and a connecting member 430, which are disclosed in FIGS. 9A and 9B, may be the same as or similar to the charging terminal structure 400, the pad part 410, the charging pad 411, the seating portion 412, the fixing member 420, and the connecting member 430, which are disclosed in FIG. 8. Accordingly, descriptions of the same configurations may be omitted.

According to various embodiments, the pad part 410 may be configured to be rotatable around a hinge shaft 229-1. The degree of rotation of the pad part 410 may be different according to the position of a first wearing member (e.g., the first wearing member 203a of FIG. 2). According to an embodiment, the pad part 410 may be disposed at a first position 710, and may be disposed at a second position 720.

According to various embodiments, the pad part 410 in the first position 710 may be a state in which the first wearing member 203a is disposed farther to the lens frame 202 than the second wearing member 203b as illustrated in FIGS. 6A and 6B.

According to various embodiments, the pad part 410 in the second position 720 may be a state in which the first wearing member 203a is disposed closer to the lens frame 202 than the second wearing member 203b as illustrated in FIGS. 5A and 5B.

According to various embodiments, even though the pad part 410 is disposed at the first position 710, or is disposed at the second position, the seating portion 412 of the pad part 410 may be formed to be in continuous contact with the external electrode 450. A detailed description of the shape of the seating portion 412 will be described later along with the description of FIG. 10.

Figure 10:
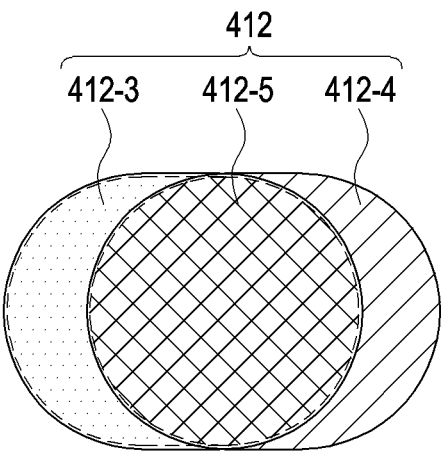
FIG. 10 is a plan view of a seating portion according to an embodiment of the disclosure.

FIG. 10 is a plan view of a seating portion according to an embodiment of the disclosure.

A seating portion 412 disclosed in FIG. 10 may be the same as or similar to the seating portion 412 disclosed in FIGS. 8, 9A, and 9B. Accordingly, descriptions of the same configurations may be omitted.

According to various embodiments, the seating portion 412 may be formed to have a first portion 412-3, a second portion 412-4, and a common portion 412-5. The shape formed by the first portion 412-3 and the common portion 412-5 may be an ellipse shape, and the shape formed by the second portion 412-4 and the common portion 412-5 may also be an ellipse shape. The shape formed by the first portion 412-3, the second portion 412-4, and the common portion 412-5 may be a shape in which two ellipses are overlapped with each other. In spite of various positions (e.g., the first position 710 or the second position 720 of FIG. 9A) of a pad part (e.g., the pad part 410 of FIG. 9A), since the first portion 412-3 and the common portion 412-5, and the second portion 412-4 and the common portion 412-5 are formed in an ellipse shape, the contact area between the seating portion 412 and an external electrode (e.g., the external electrode 450 of FIG. 9A) may increase. Accordingly, electrical connectivity between the seating portion 412 and the external electrode 450 may be improved.

A wearable electronic device (e.g., the wearable electronic device 200 of FIG. 2) according to various embodiments of the disclosure may include a lens frame (e.g., the lens frame 202 of FIG. 2) which is configured to accommodate a display member (e.g., the display member 201 of FIG. 2) and includes a first end (e.g., the first end 202c of FIG. 2) and a second end (e.g., the second end 202d of FIG. 2) opposite to the first end, a hinge structure including a first hinge structure (e.g., the first hinge structure 229a of FIG. 2) connected to the first end and a second hinge structure (e.g., the second hinge structure 229b of FIG. 2) connected to the second end, a wearing member (e.g., the wearing member 203 of FIG. 2) including a first wearing member (e.g., the first wearing member 203a of FIG. 2) connected to the first hinge structure and a second wearing member (e.g., the second wearing member 203b of FIG. 2) connected to the second hinge structure, the first wearing member or the second wearing member being configured to relatively move with respect to the lens frame, a first battery (e.g., the battery 243 of FIG. 3) disposed in the first wearing member, a first circuit board (e.g., the circuit board 241 of FIG. 3) which is disposed in the first wearing member and includes a pair of first electrodes (e.g., the electrode 440 of FIG. 8), and a charging terminal structure (e.g., the charging terminal structure 400 of FIG. 8) which is disposed in the first wearing member and includes a pair of first charging pads (e.g., the charging pad 411 of FIG. 8) capable of being exposed to the outside, wherein the charging terminal structure includes connecting members (e.g., the connecting member 430 of FIG. 8) arranged in the first wearing member and configured to electrically connect the first charging pads and the pair of first electrodes.

According to various embodiments, the wearable electronic device may be configured to provide a first state in which the first charging pads is not exposed and a second state in which the first charging pads is exposed to the outside according to a relative position between the wearing member and the lens frame.

According to various embodiments, the wearable electronic device in the second state may be configured such that the first wearing member is positioned closer with respect to the lens frame than the second wearing member.

According to various embodiments, the wearable electronic device in the second state may be configured such that a first external angle between the lens frame and the first wearing member is greater than a second external angle between the lens frame and the second wearing member.

According to various embodiments, the wearable electronic device in the second state may be further configured such that a first internal angle between the lens frame and the first wearing member is smaller than a second internal angle between the lens frame and the second wearing member.

According to various embodiments, the wearable electronic device in the second state may be configured such that the second wearing member is positioned closer with respect to the lens frame than the first wearing member.

According to various embodiments, the first state may be a state in which the wearing member is folded closed with respect to the lens frame, and the second state may be a state in which the wearing member is folded open with respect to the lens frame.

According to various embodiments, the first charging pads and the connecting member may be configured to be fixed through a fixing member (e.g., the fixing member 420 of FIG. 8).

According to various embodiments, a seating portion (e.g., the seating portion 412 of FIG. 8) may be formed on the first charging pads.

According to various embodiments, the shape of the seating portion is a shape in which two ellipses are overlapped with each other.

According to various embodiments, the charging terminal structure may be disposed adjacent to the first hinge structure.

According to various embodiments, the first electrodes may be electrically connected to a charging circuit disposed on the first circuit board.

According to various embodiments, the fixing member may be formed as a screw, and the fixing member may be disposed to couple the first charging pads and the connecting member.

According to various embodiments, a seating portion (e.g., the seating portion 412 of FIG. 8) may be formed on one end (or a first end) of the first charging pads, and a hole (e.g., the connecting hole 431 of FIG. 8) is formed through the other end (or a second end) of the first charging pads.

According to various embodiments, the seating portion may be configured to be in continuous contact with the first electrodes.

According to various embodiments, the first charging pads may be rotatable around a hinge shaft (e.g., the hinge shaft 229-1 of FIGS. 9A to 9B).

According to various embodiments, a second battery (e.g., the battery 243 in FIG. 3) disposed in the second wearing member, a second circuit board (e.g., the circuit board 241 of FIG. 3) which is disposed in the second wearing member and includes a pair of second electrodes (e.g., the electrode 440 of FIG. 8), a charging terminal structure (e.g., the charging terminal structure 400 of FIG. 8) which is disposed in the second wearing member and includes a pair of second charging pads (e.g., the charging pad 411 of FIG. 8) capable of being exposed to the outside, and a connecting members (e.g., the connecting member 430 of FIG. 8) disposed in the second wearing member and configured to electrically connect the second charging pads and the pair of second electrodes, may be included therein.

A wearable electronic device (e.g., the wearable electronic device 200 of FIG. 2) according to various embodiments of the disclosure may include a lens frame (e.g., the lens frame 202 of FIG. 2) which is configured to accommodate a display member (e.g., the display member 201 of FIG. 2) and includes a first end (e.g., the first end 202c of FIG. 2) and a second end (e.g., the second end 202d of FIG. 2) opposite to the first end, a hinge connecting structure (e.g., the hinge connecting structure 230 of FIG. 5B) including a first hinge connecting structure (e.g., the first hinge connecting structure 230a of FIG. 5B) connected to the first end and a second hinge connecting structure (e.g., the second hinge connecting structure 230b of FIG. 5B) connected to the second end, a hinge structure including a first hinge structure (e.g., the first hinge structure 229a of FIG. 2) connected to the first hinge connecting structure and a second hinge structure (e.g., the second hinge structure 229b of FIG. 2) connected to the second hinge connecting structure, a wearing member (e.g., the wearing member 203 of FIG. 2) including a first wearing member (e.g., the first wearing member 203a of FIG. 2) connected to the first hinge structure and a second wearing member (e.g., the second wearing member 203b of FIG. 2) connected to the second hinge structure, the first wearing member or the second wearing member being configured to relatively move with respect to the lens frame, a first battery (e.g., the battery 243 of FIG. 3) disposed in the first wearing member, a circuit board (e.g., the circuit board 241 of FIG. 3) which is disposed in the first wearing member and includes a pair of electrodes (e.g., the electrode 440 of FIG. 8), and a charging terminal structure (e.g., the charging terminal structure 400 of FIG. 8) which is disposed in the first wearing member and includes a pair of first charging pads (e.g., the charging pad 411 of FIG. 8) capable of being exposed to the outside, wherein the charging terminal structure includes a connecting member (e.g., the connecting member 430 of FIG. 8) disposed in the first wearing member and configured to electrically connect the first charging pads and the pair of electrodes.

According to various embodiments, the wearable electronic device may be configured to provide a first state in which the first charging pads is not exposed and a second state in which the first charging pads is exposed to the outside according to a relative position between the wearing member and the lens frame.

According to various embodiments, the wearable electronic device in the second state may be configured such that the first wearing member is positioned closer with respect to the lens frame than the second wearing member.

According to various embodiments, the wearable electronic device in the second state may be configured such that the second wearing member is positioned closer with respect to the lens frame than the first wearing member.

According to various embodiments, the first charging pads and the connecting member may be configured to be fixed through a fixing member (e.g., the fixing member 420 of FIG. 8).

According to various embodiments, a seating portion (e.g., the seating portion 412 of FIG. 8) may be formed on the first charging pads.

According to various embodiments, the shape of the seating portion may be a shape in which two ellipses are overlapped with each other.

According to various embodiments, the fixing member may be formed as a screw, and the fixing member may be disposed to couple the first charging pads and the connecting member.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A wearable electronic device comprising:
a lens frame configured to accommodate a display member and comprising a first end and a second end opposite to the first end;
a hinge structure comprising a first hinge structure connected to the first end and a second hinge structure connected to the second end;
a wearing member comprising a first wearing member connected to the first hinge structure and a second wearing member connected to the second hinge structure, the first wearing member or the second wearing member being configured to rotate with respect to the lens frame;
a first battery disposed in the first wearing member;
a first circuit board disposed in the first wearing member and comprising first electrodes; and
a charging terminal structure disposed in the first wearing member and comprising:
first charging pads exposable to an outside away from the hinge structure when the first wearing member is folded relative to the lens frame, and connecting members arranged in the first wearing member and configured to electrically connect each of the first charging pads and the first electrodes,
wherein the first charging pads comprise a seating portion configured to be connected to an external power source, and
wherein the charging terminal structure is configured to be rotatable around a hinge shaft of the first hinge structure together with the first wearing member and covering a portion of the first hinge structure.
2. The wearable electronic device of claim 1, wherein the wearable electronic device is configured to provide a first state in which the first charging pads are not exposed and a second state in which the first charging pads are exposed to the outside according to a relative position between the wearing member and the lens frame.
3. The wearable electronic device of claim 2, wherein the wearable electronic device in the second state is further configured such that the first wearing member is positioned closer with respect to the lens frame than the second wearing member is positioned.
4. The wearable electronic device of claim 3, wherein the wearable electronic device in the second state is further configured such that a first external angle between the lens frame and the first wearing member is greater than a second external angle between the lens frame and the second wearing member.
5. The wearable electronic device of claim 3, wherein the wearable electronic device in the second state is further configured such that a first internal angle between the lens frame and the first wearing member is smaller than a second internal angle between the lens frame and the second wearing member.
6. The wearable electronic device of claim 2, wherein the wearable electronic device in the second state is further configured such that the second wearing member is positioned closer with respect to the lens frame than the first wearing member is positioned.
7. The wearable electronic device of claim 2,
wherein the first state is a state in which the wearing member is folded closed with respect to the lens frame, and
wherein the second state is a state in which the wearing member is folded open with respect to the lens frame.
8. The wearable electronic device of claim 1, wherein the first charging pads and the connecting members are configured to be fixed by a fixing member.
9. The wearable electronic device of claim 1, wherein a shape of the seating portion is a shape in which two ellipses overlap each other.
10. The wearable electronic device of claim 1, wherein the charging terminal structure is disposed adjacent to the first hinge structure.
11. The wearable electronic device of claim 1, wherein the first electrodes are electrically connected to a charging circuit disposed on the first circuit board.
12. The wearable electronic device of claim 8,
wherein the fixing member is in a form of a screw, and
wherein the fixing member is disposed to couple the first charging pads and the connecting members.
13. The wearable electronic device of claim 1,
wherein the seating portion is disposed on a first end of the first charging pads, and
wherein a hole is formed through a second end of the first charging pads.

14. The wearable electronic device of claim 13, wherein the seating portion is configured to be in continuous contact with the first electrodes.

15. The wearable electronic device of claim 1, wherein the first charging pads are rotatable around the hinge shaft.

16. The wearable electronic device of claim 1, further comprising:

a second battery disposed in the second wearing member;

a second circuit board disposed in the second wearing member and comprising second electrodes;

a charging terminal structure disposed in the second wearing member and comprising second charging pads exposable to the outside; and a connecting member disposed in the second wearing member and configured to electrically connect the second charging pads and the second electrodes.

17. A wearable electronic device comprising:

a lens frame configured to accommodate a display member and comprising a first end and a second end opposite to the first end;

a hinge connecting structure comprising a first hinge connecting structure connected to the first end and a second hinge connecting structure connected to the second end;

a hinge structure comprising a first hinge structure connected to the first hinge connecting structure and a second hinge structure connected to the second hinge connecting structure;

a wearing member comprising a first wearing member connected to the first hinge structure and a second wearing member connected to the second hinge structure, the first wearing member or the second wearing member being configured to rotate with respect to the lens frame;

a first battery disposed in the first wearing member;

a circuit board disposed in the first wearing member and comprising electrodes; and a charging terminal structure disposed in the first wearing member and comprising:

first charging pads exposable to an outside away from the hinge structure when the first wearing member is folded relative to the lens frame, and connecting members disposed in the first wearing member and configured to electrically connect each of the first charging pads and the electrodes, wherein the first charging pads comprise a seating portion configured to be connected to an external power source, and wherein the first charging pads are configured to be rotatable around a hinge shaft of the first hinge structure and covering a portion of the first hinge structure.

18. The wearable electronic device of claim 17, wherein the wearable electronic device is configured to provide a first state in which the first charging pads are not exposed and a second state in which the first charging pads are exposed to the outside according to a relative position between the wearing member and the lens frame.

19. The wearable electronic device of claim 18, wherein the wearable electronic device in the second state is configured such that the first wearing member is positioned closer with respect to the lens frame than the second wearing member is positioned.

20. The wearable electronic device of claim 1, wherein the first charging pads are not exposed to the outside when the wearable electronic device is in a folded state in which the first wearing member is substantially parallel to the frame lens, and wherein the first charging pads are exposed to the outside when the wearable electronic device is in an unfolded state in which the first wearing member is substantially perpendicular to the frame lens.

* * * * *